(12) United States Patent
Higgins

(10) Patent No.: US 10,745,879 B2
(45) Date of Patent: *Aug. 18, 2020

(54) FLOATABLE APPARATUS FOR THE COLLECTION, SEPARATION, CONTAINMENT AND REMOVAL OF SOLIDS FROM A WATER BODY

(71) Applicant: P-Pod Technologies, LLC, Amesbury, MA (US)

(72) Inventor: Jonathan B. Higgins, Amesbury, MA (US)

(73) Assignee: P-POD TECHNOLOGIES, LLC, Amesbury, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/370,244

(22) Filed: Mar. 29, 2019

(65) Prior Publication Data

US 2019/0226172 A1 Jul. 25, 2019

Related U.S. Application Data

(63) Continuation-in-part of application No. 15/235,546, filed on Aug. 12, 2016, now Pat. No. 10,253,470.

(Continued)

(51) Int. Cl.
*E02B 15/04* (2006.01)
*E02B 15/10* (2006.01)
(Continued)

(52) U.S. Cl.
CPC .............. *E02B 15/10* (2013.01); *B01D 35/05* (2013.01); *C02F 1/40* (2013.01); *E02B 15/04* (2013.01);
(Continued)

(58) Field of Classification Search
CPC ...... E02B 15/04; E02B 15/045; E02B 15/046; E02B 15/048; E02B 15/08; E02B 15/0864; E02B 15/10; C02F 2103/007
(Continued)

(56) References Cited

U.S. PATENT DOCUMENTS 2,383,840 A 8/1945 Benckert
3,664,136 A 5/1972 Laval, Jr. et al.
(Continued)

FOREIGN PATENT DOCUMENTS

EP 3133209 A1 2/2017
FR 2871177 6/2004
(Continued)

OTHER PUBLICATIONS

Non-Final Office Action for U.S. Appl. No. 15/045,794, "Submersible Isolation Enclosure Apparatus", dated Sep. 22, 2016.
(Continued)

*Primary Examiner* — Christopher Upton
(74) *Attorney, Agent, or Firm* — Hamilton, Brook, Smith & Reynolds, P.C.

(57) ABSTRACT

A floatable, portable and readily deployable apparatus used in a surface water body for the collection, mixing, separation, containment and removal of total solids from fluid in surface water by settling, sorption, floatation or filtration of total solids from fluid entering or induced to flow into the apparatus. Separation of total solids from fluid can include the use and recycling of commercially available or proprietary biologic, chemical and/or physical substances and processes to increase the rate and percentage of total solids removed from fluid in the apparatus.

24 Claims, 15 Drawing Sheets

Related U.S. Application Data

(60) Provisional application No. 62/205,475, filed on Aug. 14, 2015.

(51) Int. Cl.

| | | |
|---|---|---|
| *B01D 35/05* | (2006.01) | |
| *C02F 1/40* | (2006.01) | |
| *E02B 15/06* | (2006.01) | |
| *E02B 15/08* | (2006.01) | |
| *C02F 103/00* | (2006.01) | |
| *C02F 1/00* | (2006.01) | |

(52) U.S. Cl.
CPC .......... *E02B 15/046* (2013.01); *E02B 15/048* (2013.01); *E02B 15/06* (2013.01); *E02B 15/08* (2013.01); *E02B 15/0807* (2013.01); *E02B 15/0814* (2013.01); *E02B 15/0857* (2013.01); *C02F 1/001* (2013.01); *C02F 2103/007* (2013.01); *C02F 2303/04* (2013.01)

(58) Field of Classification Search
USPC ...... 210/747.6, 776, 170.05, 170.09, 170.11, 210/242.1, 242.3, 923
See application file for complete search history.

(56) References Cited

U.S. PATENT DOCUMENTS

| | | | |
|---|---|---|---|
| 3,688,506 | A | 9/1972 | Marcocchio |
| 3,851,487 | A | 12/1974 | Lambertsen |
| 3,875,062 | A | 4/1975 | Rafael |
| 3,909,416 | A | 9/1975 | In't Veld |
| 4,047,390 | A | 9/1977 | Boyce, II |
| 4,073,143 | A | 2/1978 | Preus |
| 4,373,834 | A | 2/1983 | Grace |
| 4,395,157 | A | 7/1983 | Cunningham |
| 4,421,436 | A | 12/1983 | Burns |
| 4,449,850 | A | 5/1984 | Cessou et al. |
| 4,588,501 | A | 5/1986 | Jordan |
| 4,645,379 | A | 2/1987 | Grimsley |
| 4,900,432 | A | 2/1990 | Arnold et al. |
| 5,409,607 | A | 4/1995 | Karlberg |
| 5,478,480 | A | 12/1995 | Winstone |
| 6,457,907 | B1 | 10/2002 | De Bloeme |
| 6,592,299 | B1 | 7/2003 | Becker |
| 6,881,335 | B2 | 4/2005 | Nilsen |
| 7,785,035 | B2 | 8/2010 | Jarvinen |
| 8,523,482 | B1 | 9/2013 | Watson, Sr. |
| 8,534,365 | B2 | 9/2013 | Dighe |
| 8,678,707 | B1 | 3/2014 | Powell |
| 8,911,619 | B2 | 12/2014 | Becker |
| 9,073,105 | B2 | 7/2015 | Higgins |
| 9,725,862 | B2 | 8/2017 | Higgins |
| 10,253,470 | B2 * | 4/2019 | Higgins .................. E02B 15/10 |
| 2004/0115003 | A1 | 6/2004 | Johnston |
| 2011/0303601 | A1 | 12/2011 | Gastaldi |
| 2011/0318106 | A1 | 12/2011 | Gateff |
| 2012/0051840 | A1 | 3/2012 | Hatton |
| 2013/0108369 | A1 | 5/2013 | Splittstoesser |
| 2013/0146546 | A1 | 6/2013 | Goulet |
| 2015/0023734 | A1 | 1/2015 | Higgins |
| 2015/0034565 | A1 | 2/2015 | Vaz Viegas et al. |
| 2016/0017559 | A1 | 1/2016 | Rasmussen et al. |
| 2016/0237634 | A1 | 8/2016 | Higgins |

FOREIGN PATENT DOCUMENTS

| | | |
|---|---|---|
| WO | WO 2012/002695 | 1/2012 |
| WO | WO 2016/134036 A1 | 8/2016 |
| WO | WO 2017/030946 | 2/2017 |

OTHER PUBLICATIONS

International Preliminary Report on Patentability issued in International Application No. PCT/US2016/018297, entitled: "Submersible Isolation Enclosure Apparatus"; dated Aug. 22, 2017.

International Search Report and Written Opinion of the International Searching Authority, dated Jul. 29, 2016 for International Application No. PCT/US2016/018297 titled "Submersible Isolation Enclosure Apparatus".

Notice of Allowance for U.S. Appl. No. 15/045,794, "Submersible Isolation Enclosure Apparatus", dated Mar. 27, 2017.

Notification of Transmittal of the International Search Report and The Written Opinion of the International Searching Authority, or the Declaration for International Application No. PCT/US2016/046743, "Floatable Apparatus for the Collection, Separation, Containment and Removal of Total Solids from Surface Water", dated Oct. 24, 2016.

* cited by examiner

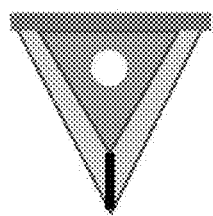
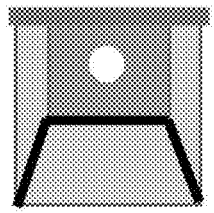
FIG. 2A            FIG. 2B
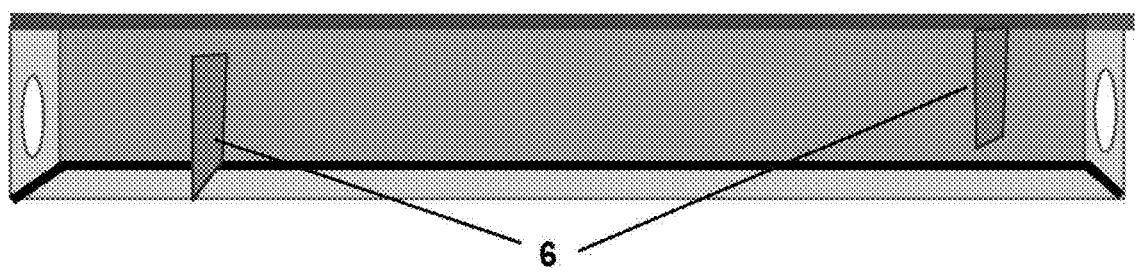
FIG. 2C
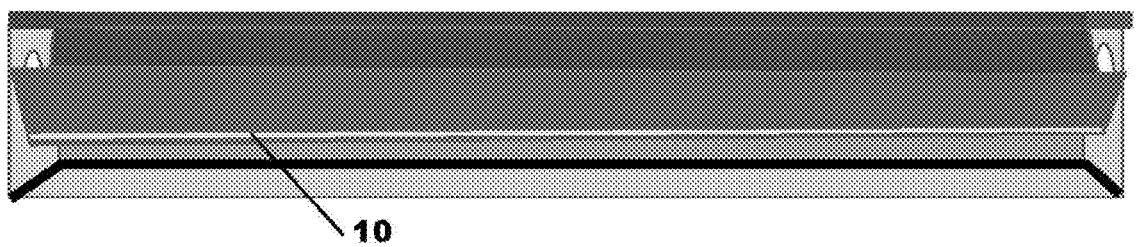
FIG. 2D

FLOATABLE APPARATUS FOR THE COLLECTION, SEPARATION, CONTAINMENT AND REMOVAL OF SOLIDS FROM A WATER BODY

RELATED APPLICATIONS

This application is a continuation in part of U.S. application Ser. No. 15/235,546 filed on Aug. 12, 2016 and claims the benefit of U.S. Provisional Application No. 62/205,475 filed on Aug. 14, 2015. The entire teachings of the above applications are incorporated herein by reference.

BACKGROUND

Increasing urbanization, poor land use practices, deposition of air emissions, poorly treated storm water flows, contaminated ground water discharges to surface water, point and nonpoint discharges of pollution, and increased use of some chemicals and nutrients among many different types of primarily human activities have led to the degradation of surface water quality. Once some types of pollution enter a water body, they can continue to impact surface water quality and use for many years; even after removing external sources of pollution. In the case of some nutrients such as phosphorus, sulfates and nitrates, this can lead to harmful algae blooms, changes in water chemistry, recreational and potable limitations on water use and economic impacts such as reduced real estate values or revenue for industries relying on clean water.

Thus, there is a need for cost effective, scalable and portable means to remove some types of pollutants present as total solids (dissolved, colloidal and total suspended solids including nutrients, algae and cyanobacteria) in surface water bodies.

SUMMARY

In one aspect, a floatable apparatus is disclosed for removal of total solids from a targeted water column or a targeted water column depth interval in a water body. The floatable apparatus comprises at least one base member enclosure of rigid to flexible, fluid pervious to impervious materials having an exterior, an interior, closed bottom, and an open or closed top having a perimeter, wherein the base member has an inlet for influent on one end of the base member, an outlet for effluent on or near the opposite end of the base member, and further wherein the interior of the at least one base member is configured with at least one wall member to remove total solids from fluid entering into the apparatus from a surface water body; at least one collection member of rigid to flexible, fluid pervious to impervious materials configured to direct fluid containing total solids through an opening into the inlet of the base member, the at least one collection member further comprising an upper perimeter having a tubular sleeve for receiving a floatation member, a bottom perimeter and a tubular sleeve at the bottom perimeter for receiving a weight, wherein the at least one collection member extends through a targeted water column or a targeted water column depth interval; optional floatation members of rigid to flexible, fluid pervious to impervious material connected or inserted into the perimeter of the at least one base member and/or the upper perimeter of the at least one collection member; and at least one attachment point on at least one of the base member, collection member and floatation member when present. In one embodiment, fluidly connected to the at least one base member enclosure is at least one other base member enclosure of rigid to flexible, fluid pervious to impervious materials having an exterior, an interior, closed bottom, and an open or closed top having a perimeter, wherein the base member has an inlet for influent on one end of the base member, an outlet for effluent on or near the opposite end of the base member, and wherein the interior provides a compartment that does not possess wall members or baffles. The compartment of the base member can be used for at least one of 1) mixing and inducing fluid flow; 2) filtration; and 3) transporting solids or the apparatus itself when being moved. In one embodiment, a base member enclosure operating in transport mode (a transport base member) comprises an exterior, an interior and closed bottom of rigid to flexible, fluid impervious material, an open or closed top having a perimeter for receiving a floatation member, an inlet for influent on one end of the base member, an outlet for effluent on or near the opposite end of the base member, the interior defining a compartment that does not possess wall members or baffles, for transporting the solids. In another embodiment, a base member enclosure operating in filtration mode (a filtration base member), comprises an exterior, an interior and closed bottom of rigid to flexible, fluid pervious material, an open or closed top having a perimeter for receiving a floatation member, an inlet for influent on one end of the base member, an outlet for effluent on or near the opposite end of the base member, the interior defining a compartment that does not possess wall members or baffles. In yet another embodiment, a base member enclosure operating in mixing/fluid flow inducing mode (mixing/inducing base member) comprises the features of the transport base member but is constructed of rigid, fluid impervious materials.

In a second aspect, a floatable apparatus is disclosed for removal of total solids from a targeted water column or a targeted water column depth interval in a water body. The floatable apparatus comprises at least one base member enclosure of rigid to flexible, fluid pervious to impervious materials having an exterior, an interior, closed bottom, and an open or closed top having a perimeter, wherein the base member has an inlet for influent on one end of the base member, an outlet for effluent on or near the opposite end of the base member, and further wherein the interior of the base member is configured to remove total solids from fluid entering into the apparatus from a surface water body; optional floatation member of rigid to flexible, fluid pervious to impervious material connected to or inserted into the perimeter of the at least one base member; and at least one attachment point on at least one of the base member or floatation member when present. In one embodiment, fluidly connected to the at least one base member enclosure is at least one base member enclosure of rigid to flexible, fluid pervious to impervious materials having an exterior, an interior, closed bottom, and an open or closed top having a perimeter, wherein the base member has an inlet for influent on one end of the base member, an outlet for effluent on or near the opposite end of the base member, and wherein the interior provides a compartment that does not possess wall members or baffles. The compartment of the base member can be used for at least one of 1) mixing and inducing fluid flow; 2) filtration; and 3) transporting solids or the apparatus itself when being moved.

In a third aspect, a floatable apparatus is disclosed for containment or isolation of solids from a targeted water column or a targeted water column depth interval in a water body. The floatable apparatus comprises at least one collection member of rigid to flexible, fluid pervious to impervious materials configured to direct fluid containing total solids through an opening, that can optionally be closed, into an inlet of a base member when connected to the at least one collection member, the at least one collection member further comprising an upper perimeter having a tubular sleeve for receiving a flotation member, a bottom perimeter and a tubular sleeve at the bottom perimeter for receiving a weight, optional flotation member; wherein the at least one collection member extends through a targeted water column or a targeted water column depth interval or can be deployed to a targeted water column or a targeted water column depth interval. In one embodiment, the floatable apparatus further comprises at least one other collection member attached at any point along the length of the first collection member, preferably attached end to end in series.

In a fourth aspect, methods are described for using the floatable apparatus herein for removing total solids from fluid of a surface water body. The methods comprise deploying a floatable apparatus to a targeted water column or a targeted water column depth interval of a water body to remove total solids from fluid of the water body; allowing or inducing fluid flow or by pumping fluid and total solids from the water body to enter a floatable apparatus; collecting the total solids in the interior of the base member of the floatable apparatus; and optionally disposing the total solids.

In a fifth aspect, methods are described for using the floatable apparatus herein for removing total solids, algae or cyanobacteria from a surface water body. The methods comprise deploying the floatable apparatus to a specific area of the water body identified as containing targeted volumes of total solids, algae or cyanobacteria, using one or more collection members to capture and collect the targeted volume of total solids and fluid for mixing and treatment with chemical and/or physical processes in the collection and base members of the apparatus to separate, contain and remove the total solids, algae or cyanobacteria from the water body.

In a sixth aspect, methods are described for using the floatation apparatus herein for isolating a portion of a surface water body prior to either applying treatment chemicals on invasive or nuisance plant or animal species or removing sediment from the bottom of surface water body. The methods comprise deploying the floatable apparatus to the specific area of the water body identified as containing targeted invasive or nuisance plants or animals or sediment; encircling and isolating the targeted area with at least one collection member; treating the isolated area and disturbing and suspending total solids including treated organic detritus, plant matter and sediments within the isolated collection member area; and processing the suspended total solids through the base members of the floatable apparatus to remove total solids from fluid.

In a seventh aspect, methods are described for using at least one collection member independent of the base member(s) for containment of solids in a targeted water column or a targeted water column depth interval in a water body. The methods comprise deploying at least one collection member to a targeted water column or a targeted water column depth interval in a water body identified as containing targeted volumes of solids selected from dissolved solids, colloidal solids, suspended solids, nutrients, algae or cyanobacteria. Once contained, at least one base member can be docked to the collection member and fluidly connected to collect, process and remove total solids from fluid.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 2A shows a cross-section view, by width, of a V-shaped trough in the base member.

FIG. 2B shows a cross-section view, by width, of a rectangular-shaped trough in the base member.

FIG. 2C shows a cross-section view, by length, of a rectangular shaped base member with wall members 6.

FIG. 2D shows a cross-section view, by length, of a stacked apparatus configuration with a V-shaped trough inside a rectangular base member. The opening 10 in the upper base member for total solids transfer is shown.

FIG. 6B depicts each of three types of base members. For examples purposes, from left to right, the first base member is for mixing and inducing flow; the middle base member comprises wall members for separation of total solids from the fluid; the third base member is used for filtering total solids from fluid using fluid pervious material 13. The base members are fluidly connected through openings 3 and 3A that can be closable for influent and effluent depending on the connectivity direction with the other components of the apparatus. The base members without wall members can be detached from the apparatus and can be used to transport recovered total solids to a pump intake or shore-based handling and storage area.

DETAILED DESCRIPTION

A description of example embodiments follows.

The floatable apparatus is comprised of the elements discussed below and with reference to the accompanying figures.

Figure 8A:
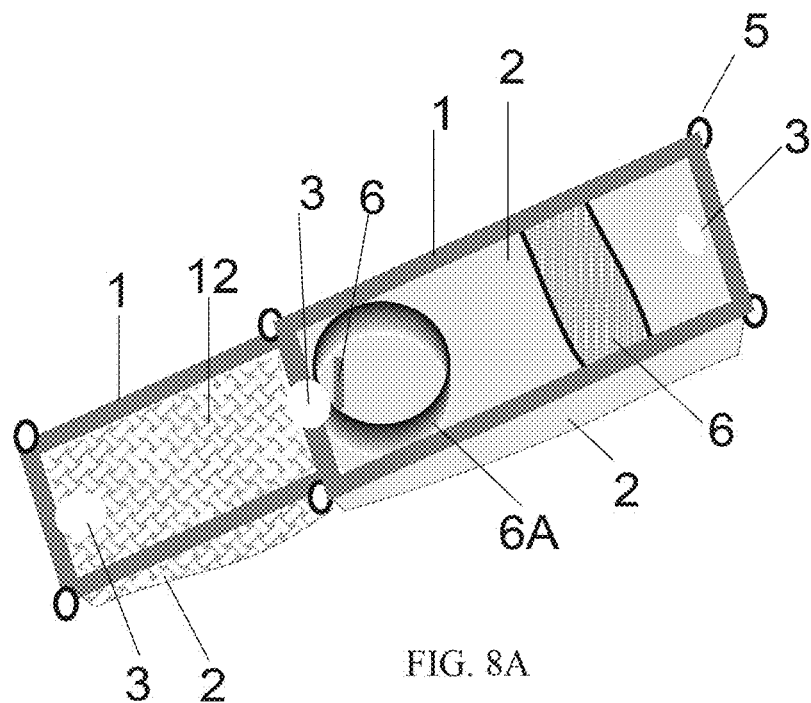
FIG. 8A is an example embodiment of a floatable apparatus without the collection member(s).
Figure 8B:
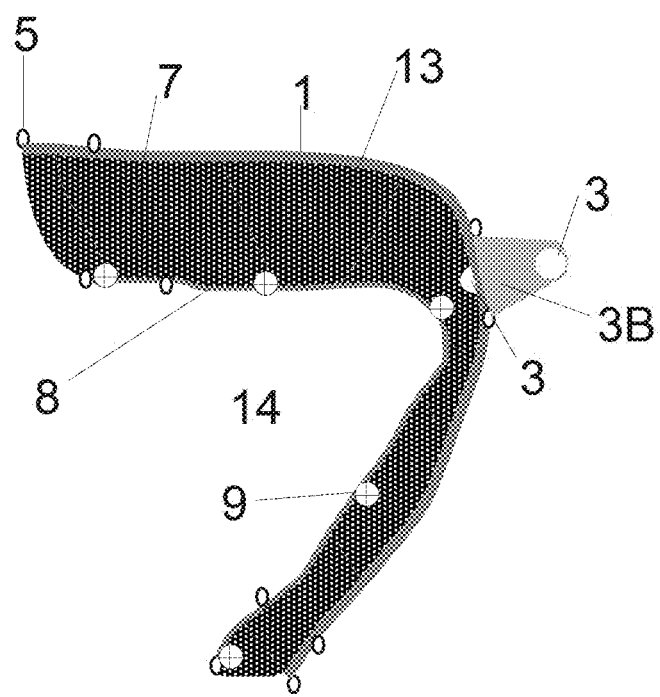
FIG. 8B is an example embodiment of a collection member without the base members fluidly connected. A three-dimensional 3B funnel-shaped opening is shown on this figure which can be opened 3 or closed 3A, as needed.

The disclosure pertains to a floatable apparatus for the collection, mixing, separation, containment and removal of total solids from fluid in surface water bodies, such as but not limited to sediment, detritus, algae or cyanobacteria, colloidal and dissolved nutrients and contaminants, from fluid entering or induced to flow into the apparatus from surface water. In one aspect, the apparatus is comprised of floatation members and one or more base members constructed of continuous film, fabric or rigid sheeting and forming troughs between floatation members, wall members to create compartments in the troughs formed by the base members and floatation members, and one or more collection members that can be used to collect, direct and induce fluid containing total solids into the apparatus. Influent and effluent or connecting openings 3 for joining to other base members can be of any size or configuration (planar- or a three dimensional-shape 3B that can be opened or closed such as a single layer of material, a cone, funnel (as shown on FIG. 8B) or cylinder configuration, unidirectional flap, bidirectional flap) and situated anywhere on the apparatus in a manner which enhances operation of the apparatus. Floatation members are attached or formed along the perimeter of each base member trough area and on collection members and include attachment points for moving the apparatus around in a surface water body, for attaching multiple apparatuses together, for attaching fixed structural supports to the apparatus, or for anchoring the apparatus in place, and attachment points and sleeves for adding rigid piping or rods to help maintain the shape and function of the apparatus when in use. The base members being configured preferably as either V-shaped and/or rectangular troughs whose cross-sectional area and length are constructed to maximize mixing, settling or floatation of total solids from fluid depending upon fluid flow rates into the apparatus, flocculation or coagulation rates of total solids, filtration rate, and the types and concentrations of total solids. Base members can also be constructed with an upper and lower trough area, essentially as vertically-stacked base members, where the upper base member has a centrally-located, longitudinal opening to allow for pass through and containment of either settling total solids from the upper base member into the lower base member or for floatation of total solids from the lower base member into the upper base member.

The wall members serve to divide the base member trough area into two or more connected compartments where the wall members are positioned vertically to horizontally in a base member and can be secured to the base member layer and extend fully or partially between the top of the floatation members to the base of the base member. Wall members can be any shape including planar or circular and can be constructed of fluid pervious or impervious film, fabric or rigid material such as boards or screens to serve as filters, weirs, baffles or barriers to facilitate separation and containment of total solids by mixing, settling, floatation or filtration. Rigid materials such as semi-flexible plastic sheeting, fencing or solid boards can be used to add support and security along the sides of collection, wall and base member areas of the apparatus. Rigid materials can also be used to form collection, wall, base and floatation members. Fluid pervious materials 13 such as rigid or flexible porous plastic layers, sheeting or plant-based fabrics can be used to form collection, wall and base members to assist in separating total solids from fluid when using the apparatus. Each base member can be constructed of one or more, end to end or side by side, interconnected base members with fluid influent and effluent locations situated to control the fluid flow retention time to maximize mixing, settling, filtration or floatation of total solids from fluid within the apparatus. One or more sections of rigid piping with perforations at selected locations can be placed along the base of each base member to facilitate either removal of total solids and fluids or addition of treatment fluids and gases to promote mixing, settling, filtration or floatation of total solids. Fluid within and effluent from the apparatus can be further processed by recycling and filtration to recover treatment fluids and to remove additional total and dissolved solids. The apparatus or sections of the apparatus can also be covered with a removable continuous film, fabric or rigid sheeting to control conditions within the apparatus, or the effects of external environmental factors, such as may be presented by wind and wave disturbance, sunlight, diffusion of gas, or water fowl, on the functioning of the apparatus. The removable cover can facilitate removal of total solids from the fluid to aid in recovery and recycling of treatment substances or fluids.

Figure 6A:
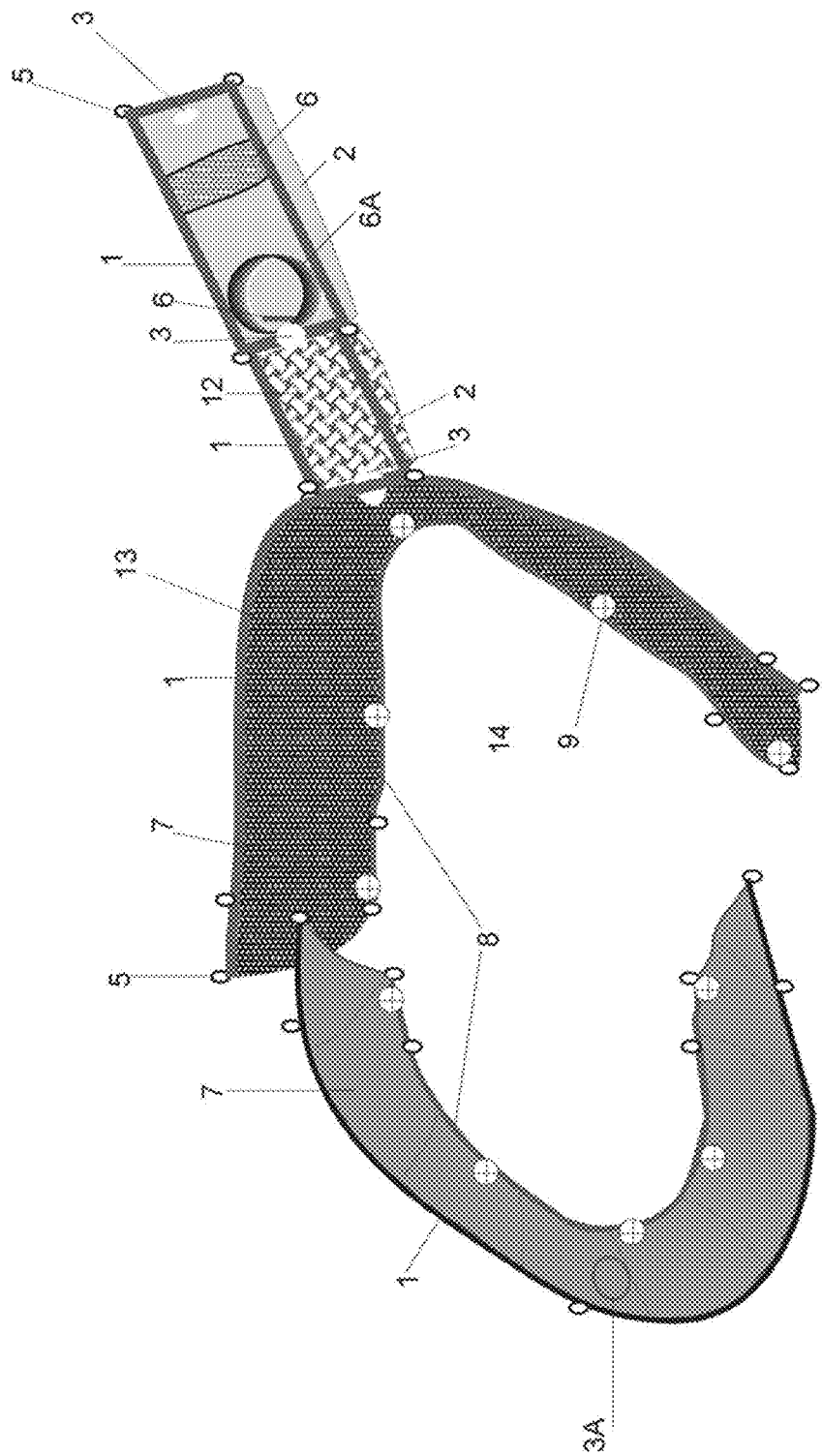
FIG. 6A is a schematic of an example floatable apparatus of the disclosure using two collection members 7. The collection member attached to the first base member is constructed of flexible, fluid pervious material 13. The opening 3 of the collection member detached from the floatable apparatus is in the closed position 3A. The opening 3 can be either planar- or a three dimensional-shape 3B that can be opened 3 or closed 3A such as a single layer of material, a cone, funnel (e.g., with the narrowed end in the direction of the fluid flow, as shown on FIG. 8B) or cylinder configuration (not shown). The first in series base member 2 is constructed of rigid, fluid impervious materials 12 and is used for mixing and inducing fluid flow into the next in series base member. The second in series base member 2 contains a circular wall member 6A and planar wall members 6 and is used to separate and contain total solids from fluid entering the base members. Other base members, not shown, can be fluidly connected to the first or second base member depending on intended operation.
Figure 6B:
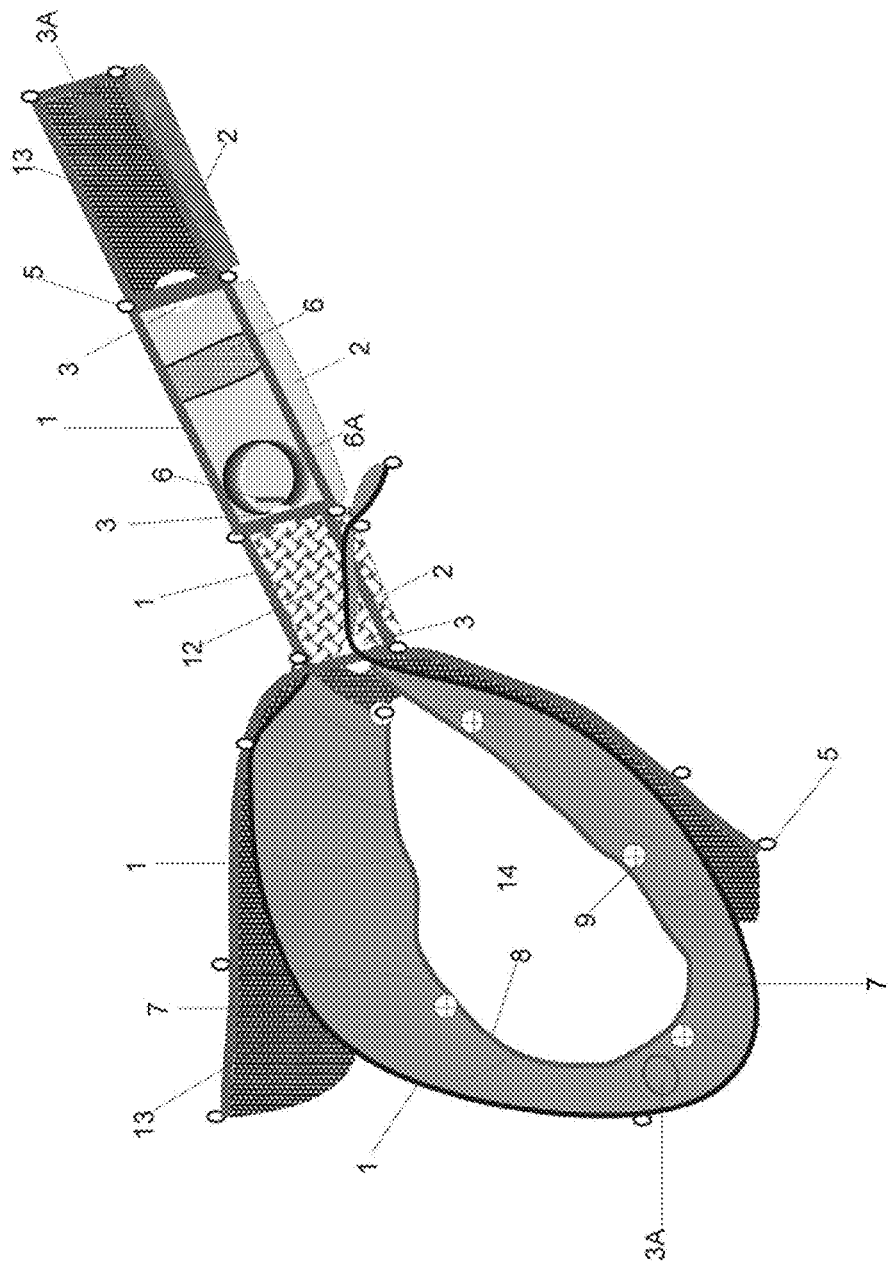
FIG. 6B depicts use of the second collection member 7 from FIG. 6A to both contain, in containment area 14, and induce fluid containing total solids to flow into the base members 2 of the floatable apparatus for separation, containment and removal of total solids.
Figure 6C:
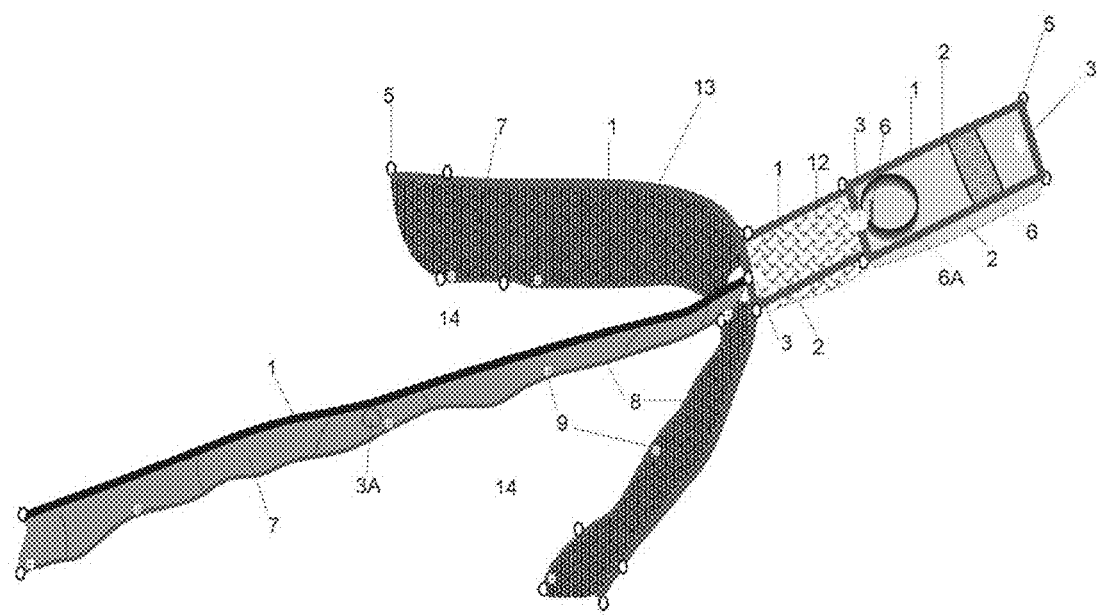
FIG. 6C shows a configuration similar to FIG. 6A but with a second collection member 7 attached near the influent opening 3 of the floatable apparatus and extending from the first base member into the water body. This additional collection member 7 can, similar to the FIG. 6B illustration, be used to encircle containment areas 14 and then to induce the flow of targeted total solids in fluid back into the base members 2 for separation and removal of total solids from fluid.
Figure 6D:
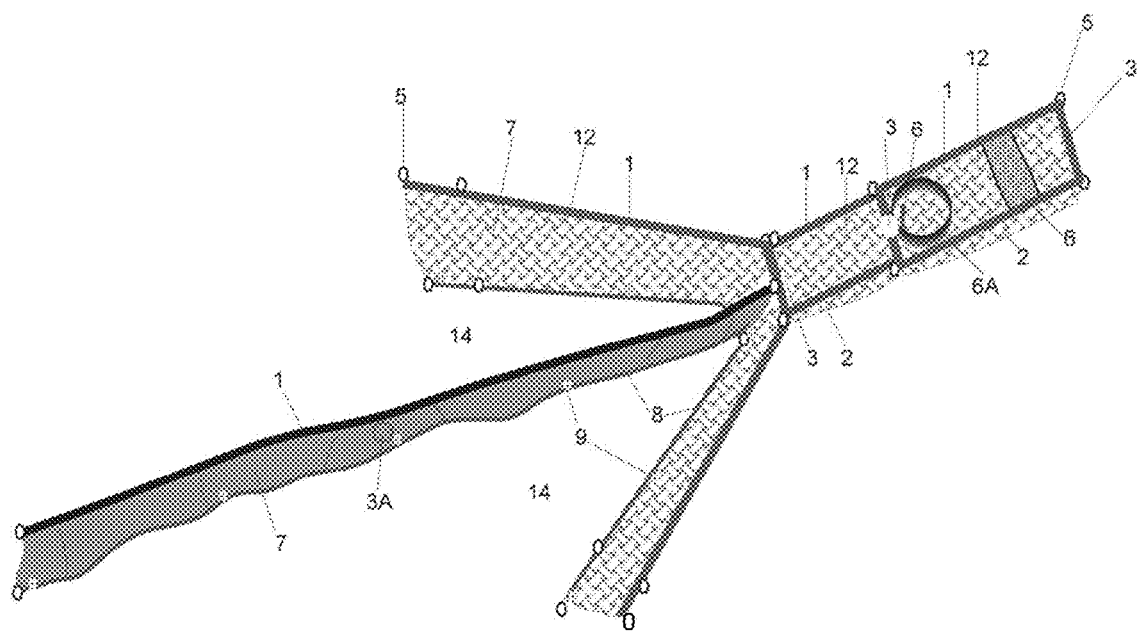
FIG. 6D shows the same example apparatus configuration as in FIG. 6C but with rigid, fluid impervious materials 12 used to form the primary collection member 7 and base members 2 of the floatable apparatus.
Figure 6E:
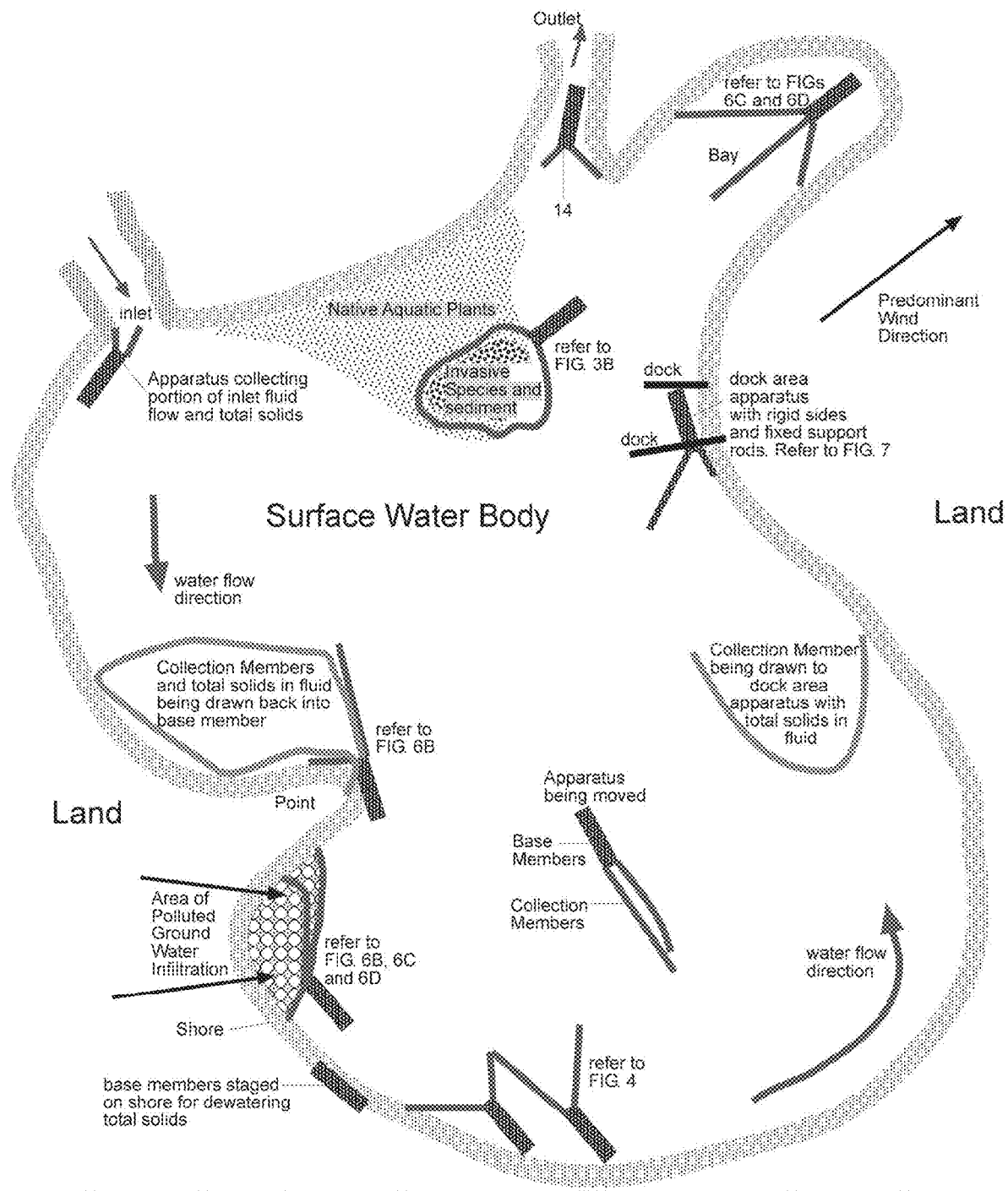
FIG. 6E shows example uses, locations and configurations for the apparatus in a surface water body. The number and type of base members are not shown.
Figure 7A:
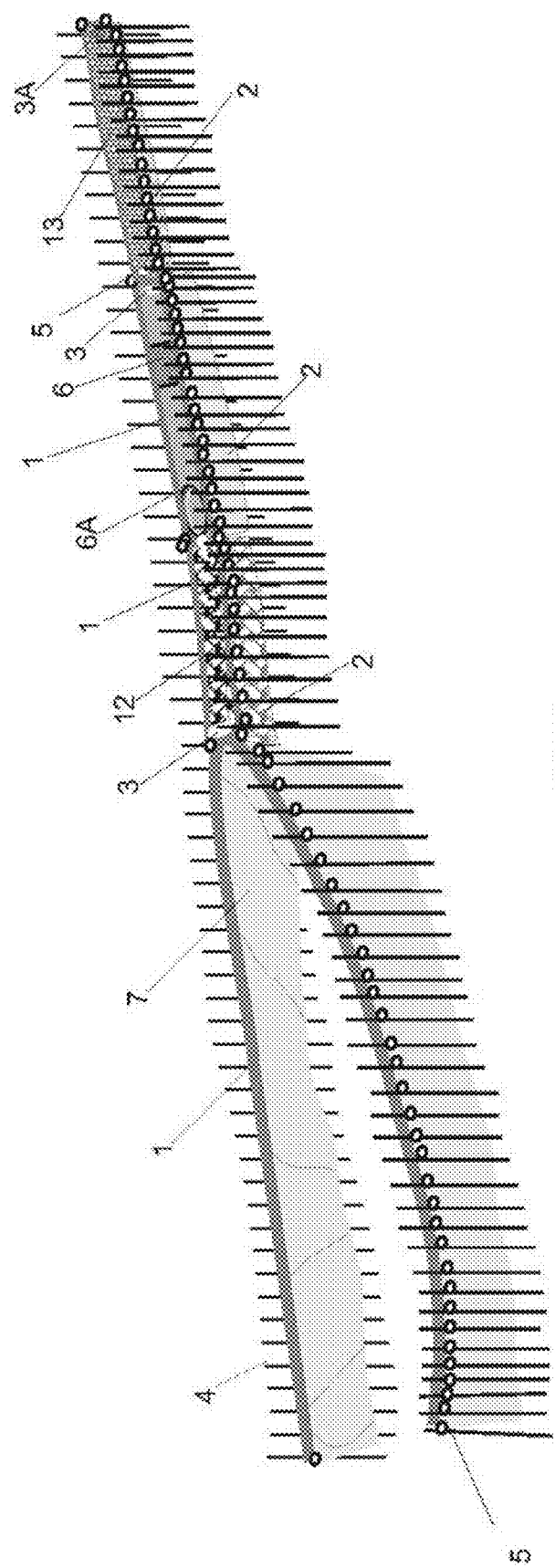
FIG. 7A is a schematic of an example floatable apparatus using rods 4 to support the sides of the collection member 7 and base members 2. Base members include a rigid sided, fluid impervious material 12 base member for mixing and inducing fluid flow, and a fluid pervious material 13 base member for a final filtration step to remove residual total solids. The center base member houses two types of wall members, planar 6 and circular 6A. The number of rods 4 are for illustration purposes and can vary in number, length and size.
Figure 7B:
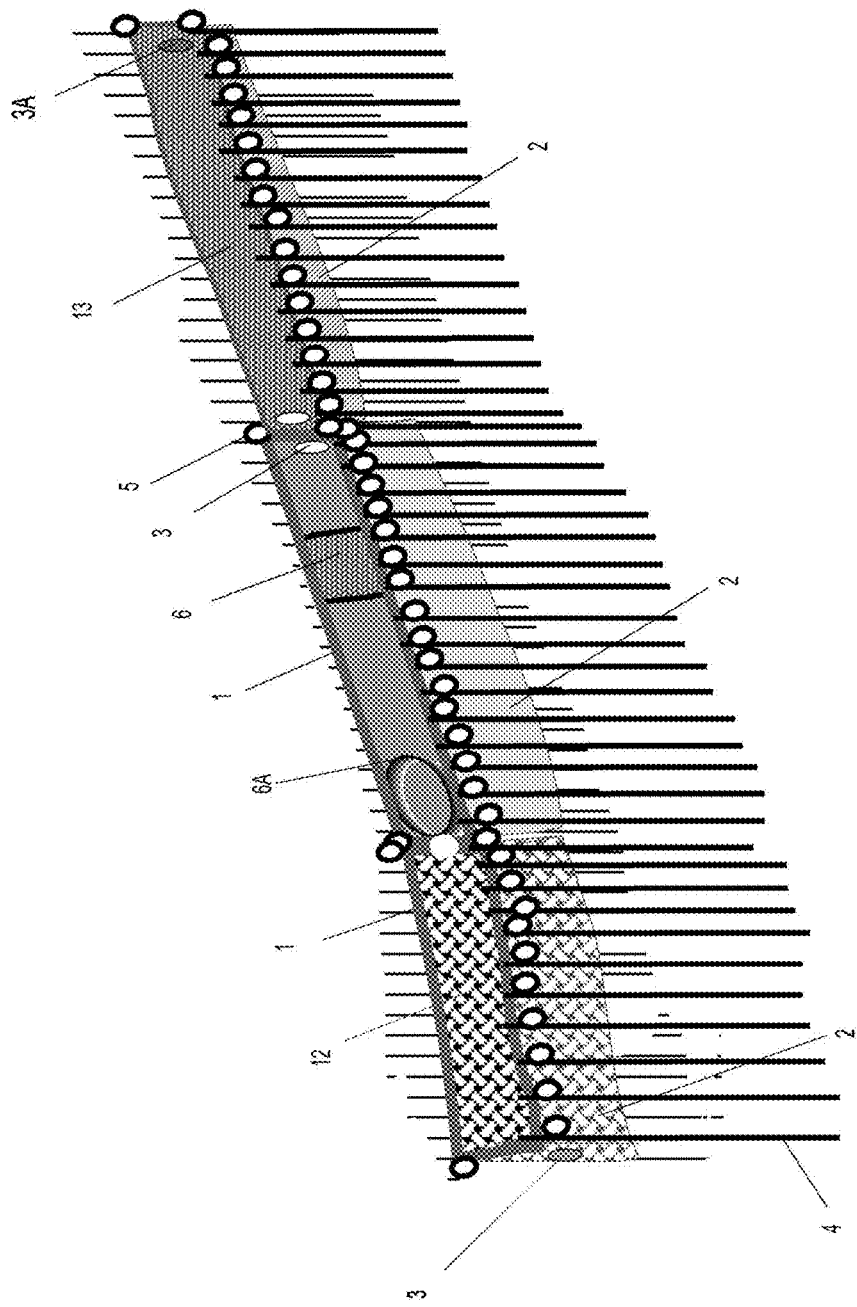
FIG. 7B is a schematic of an example floatable apparatus with collection members detached. The base members of the apparatus are staged above the water surface or on land.
Figure 7C:
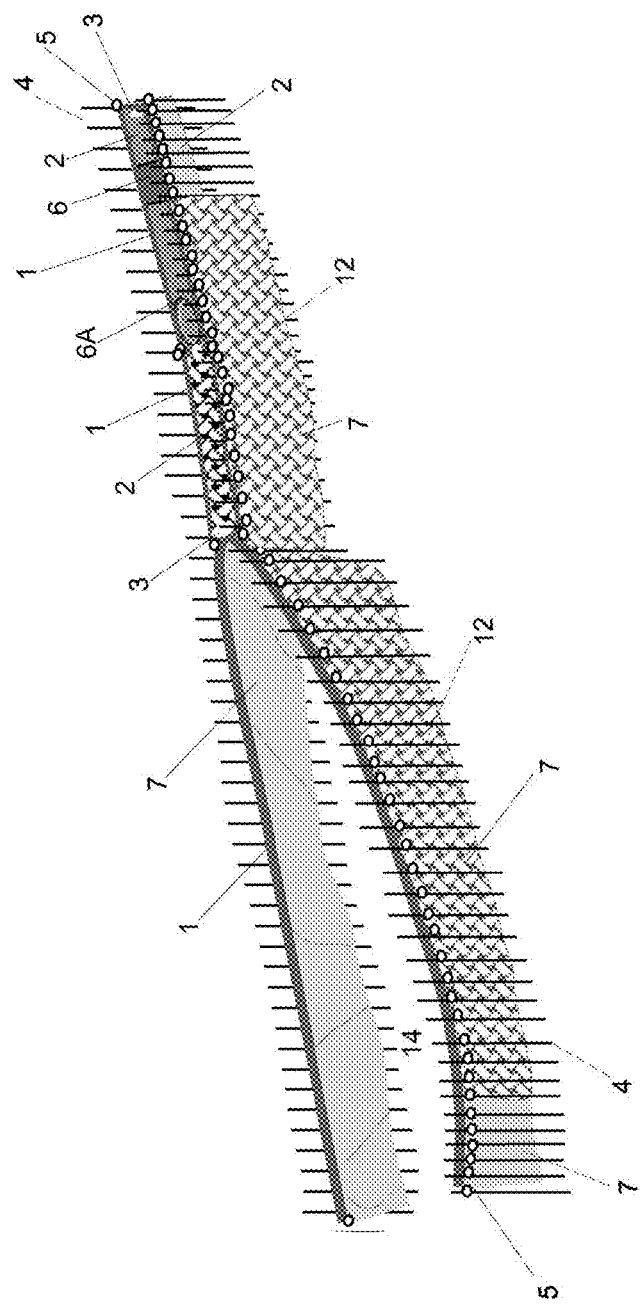
FIG. 7C depicts an example apparatus using rigid, fluid impervious materials 12 along the sides of the collection and base members. These rigid materials can be a separate collection member 7 made of rigid material that can be brought alongside the flexible portions of the apparatus for added strength, weather resistance or reinforcement. Collection member 7 can extend the length of the apparatus or partially along the apparatus. Shown is a partial cut-a-way on the facing side of the figure near one end of the collection member and again near the effluent end of the final base member, to view the base member configuration.

As shown in FIGS. 5C, 5E, 5F, 6A, 6B, 6C, 6D, 6E and 7A, 7B and 7C, rigid, fluid impervious 12 or pervious 13 materials can be used to form all or parts of the collection, wall, base and floatation members of the apparatus as a means to add support, security and to enhance the removal of total solids from fluid. As shown in FIG. 7C, rigid materials such as a separate collection member 7 can also be fixed to the sides of the primary collection and base members to add support and security. Support and security provided by the use of rigid material for the apparatus may be needed in surface water areas subject to heavy winds, waves, currents, or where access to the apparatus by people or animals is otherwise unrestricted. Rigid, fluid pervious or impervious materials can be either solid or semi-rigid materials including porous plastic sheeting, layers, plant-based fabric, fencing or boards. Rods 4 can be used to secure the apparatus and rigid materials, if used, within targeted areas of the surface water body or along the shore. The apparatus can be lowered onto or raised above the water surface or shore when using support rods 4. See FIGS. 7A, 7B and 7C.

Flexible, fluid pervious to impervious materials such as continuous sheeting, layers or fabric can be used to construct all or parts of the collection, wall, base and floatation members as an aid to removal of total solids from fluid. FIGS. 6A and 6B depict the use of fluid pervious materials 13 and fluid impervious materials 12 for collection and base members of the apparatus. Fluid pervious materials can be selected with various pore sizes and permeability to enhance collection and removal of total solids from fluid by screening or filtering. Materials of construction such as plant fiber-based or polyethylene, oleophilic or oleophobic fabrics, and coatings such as aluminum-, chitosan, iron- or zinc-based compounds on the fluid pervious to impervious materials can also be selected and used to enhance the removal of total solids by filtration, coagulation, sorption and flocculation within and on the apparatus. As shown in FIGS. 6E and 7B, fluid pervious material 13 constructed base members can also be used to dewater recovered total solids when used on shore or raised above the water surface using rods 4 or other support structures.

Figure 1:
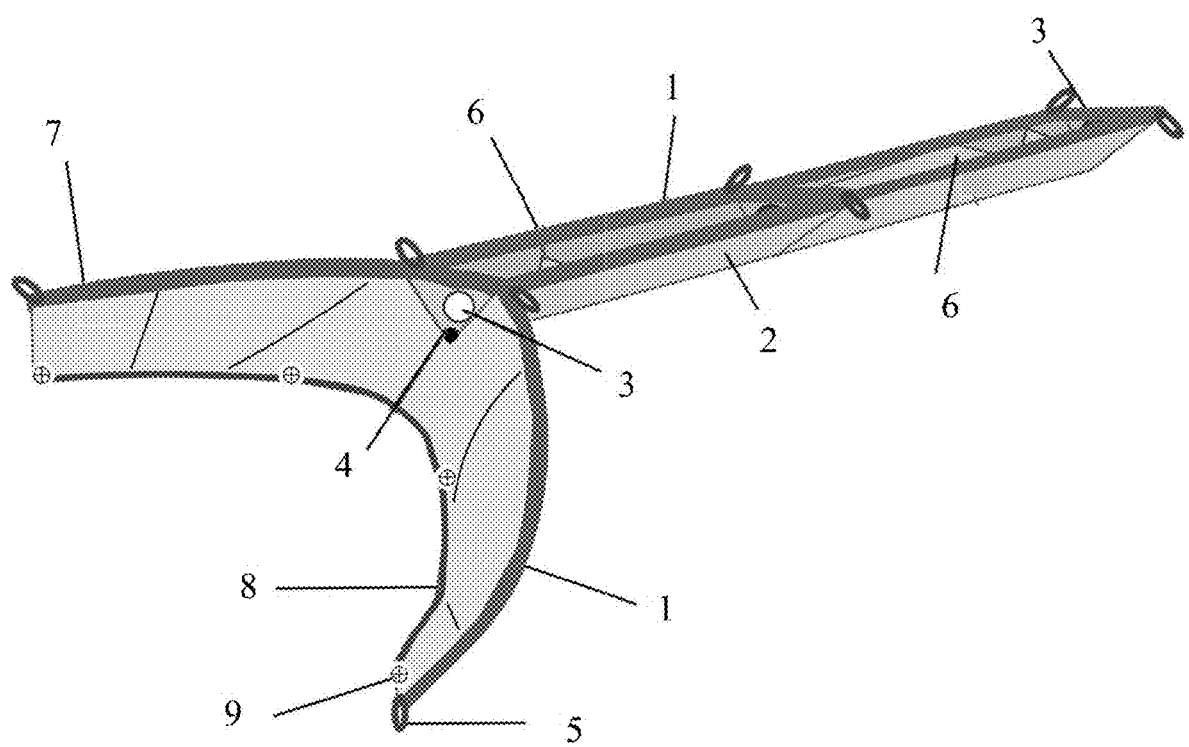
FIG. 1 is a schematic of an example floatable apparatus.
Figure 3A:
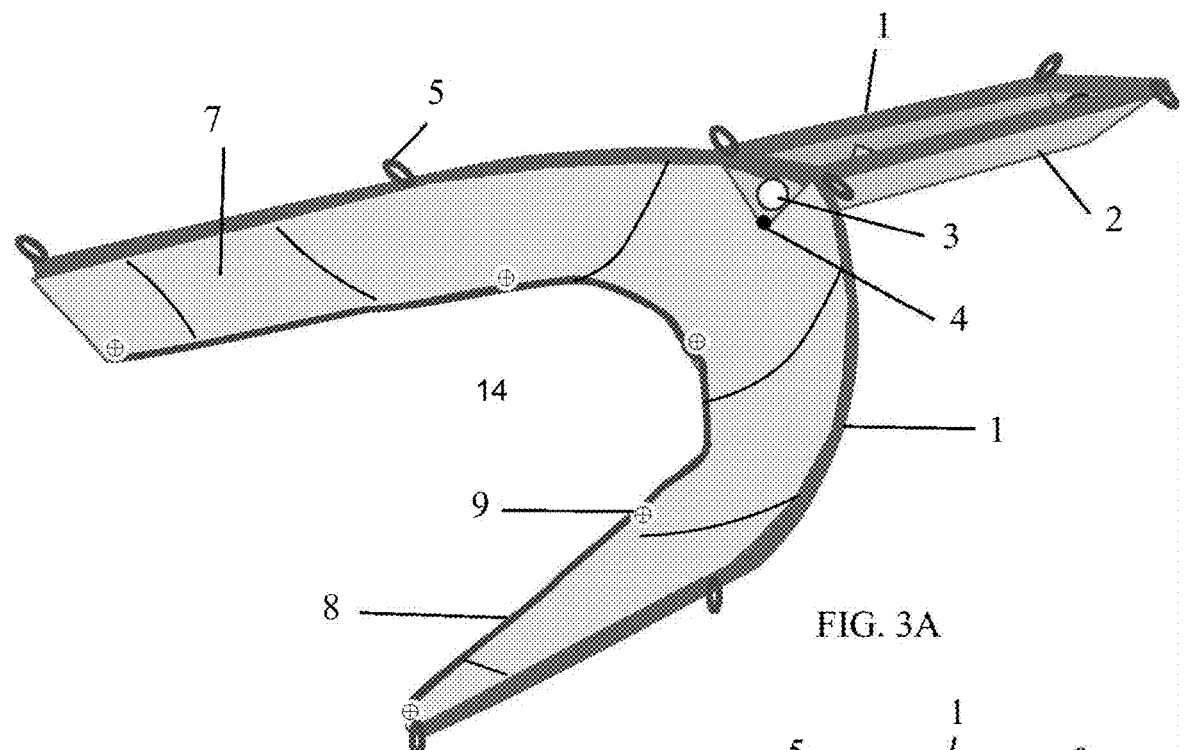
FIG. 3A is a schematic of an example floatable apparatus with an open collection member.
Figure 3B:
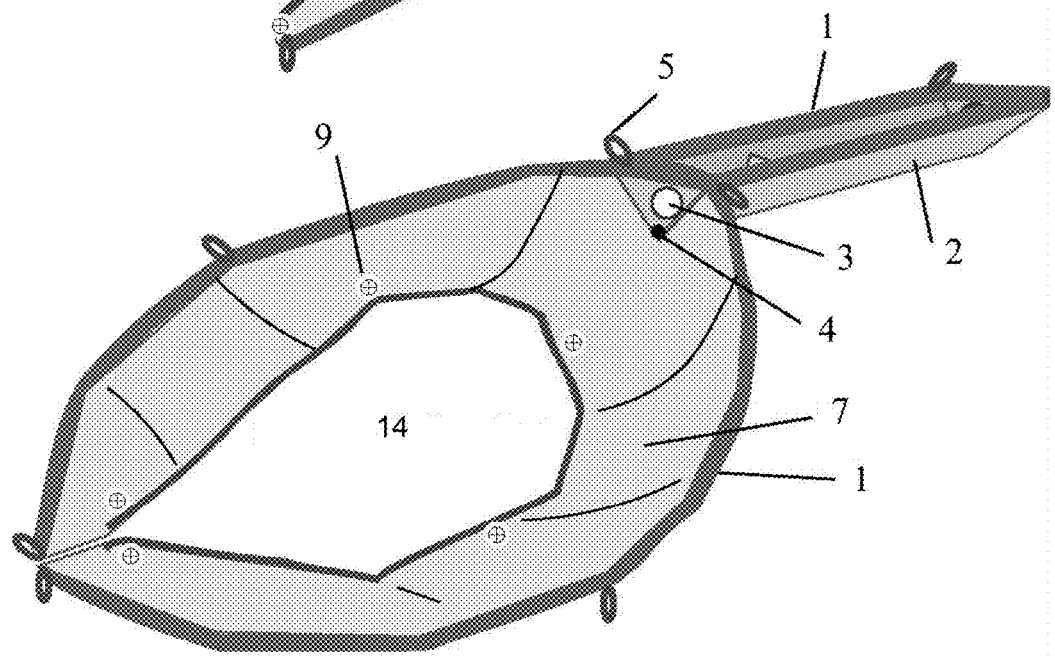
FIG. 3B is a schematic of an example floatable apparatus with a closed collection member encircling a containment area 14.

One or more tubular floatation members constructed of fluid pervious to impervious material that can be a continuous film, fabric or rigid sheeting, preferably fluid impervious materials 12 such as polyethylene, polyester or nylon based layers, including film or coatings of polyvinyl chloride or similar to limit air permeation through the film or fabric. The floatation member can be inflated with gas or filled with solid floatation material inserts to provide buoyancy to the floatable apparatus of the invention. Seams of the floatation members can be sewn, heat sealed, radio-frequency sealed, and/or adhesive sealed to minimize air permeation, water permeation and loss of floatation capacity. The floatation members can be present on the floatable apparatus in removable sections or they can be integrally formed along the perimeter of the base or collection members, as for example by seaming the base member material into pockets or sleeves to allow for insertion of inflatable tubes of water and air resistant material or solid floatation material. For example, sections of each floatation member can be removed or modified to facilitate connection to other base members and fluid flow into and out of the apparatus. Floatation members can be fixed to or detachable from the floatable apparatus through attachment points 5 located on the floatation members, the base member, the collection member or combination of these. FIG. 1 shows floatation members 1 on the upper perimeter of the collection member 7 and on the upper perimeter of the base members 2. The floatation members are in contact with the surface of the water when deployed in the water body. The floatation members can be deflated when the apparatus is not in use or to protect the device from environmental conditions, such as strong winds and wave turbulence from approaching storms by submerging the floatable apparatus. Depending upon the depth of the total solids in a surface water body, the floatation members can be inflated or deflated to accommodate the collection depth of the total solids.

One or more V-shaped and/or rectangular-shaped base members 2 (FIG. 1) are fluidly connected to each other and further connected to the floatation members. The base members are constructed of fluid pervious to impervious materials that can be a continuous film, fabric or rigid sheeting, preferably, polyethylene, polyester, nylon, or woven fabric, including film or coatings of polyvinyl chloride or similar. Base members can be interconnected side by side or end to end with other base members to increase the retention time for fluid and total solids entering or leaving the apparatus from influent opening 3 and effluent opening 3, both of which can be opened or closed 3A depending upon operation mode. A plurality of base members can be interconnected using attachment points or they can be sewn together or integrally formed.

In one configuration, two base members can also be vertically stacked with lower and upper base members during operation of the apparatus to assist with the settling or floatation of total solids from fluid. FIGS. 2A-2D depict cross-section views of the base members 2 in V-shaped or rectangular configurations that are further shown in single or stacked configurations. For vertically-stacked configurations of two base members (e.g., FIG. 2D), the upper base member will have a centrally-located, longitudinal opening 10 to allow for settling total solids to pass into the lower base member or for floatable total solids to float up into the upper base member from the lower base member trough area. In this manner settling or floatable total solids can be separated and contained from portions of the base member troughs where fluid is flowing through the apparatus. Separated total solids can be removed as needed from the floatable apparatus, and base member units containing processed total solids can be detached from the floatable apparatus and transported to a land-based area for direct removal of total solids from the floatable apparatus and surface water body. Alternatively, this same function can also be provided by piping connecting the floatable apparatus to a shore-based area or boat to allow for pumping out and removal of total solids from the floatable apparatus and surface water body. As shown in FIG. 6E, the floatable apparatus can also be connected to natural or manmade fluid inlet(s) or outlet(s) of a surface water body to allow for collection, separation, containment and removal of total solids from fluid entering the apparatus before discharging of this fluid into the surface water body or it's outlet(s).

As shown on FIGS. 6E and 7B, base members can be staged above the water surface or on land either for storage until needed or to serve as dewatering containers for recovered total solids. Dewatering of total solids is advantageous for off surface water body handling and disposal or reuse of recovered total solids. The base members can be raised out of the water for the season, for maintenance or during periods of non-use.

Figure 5A:
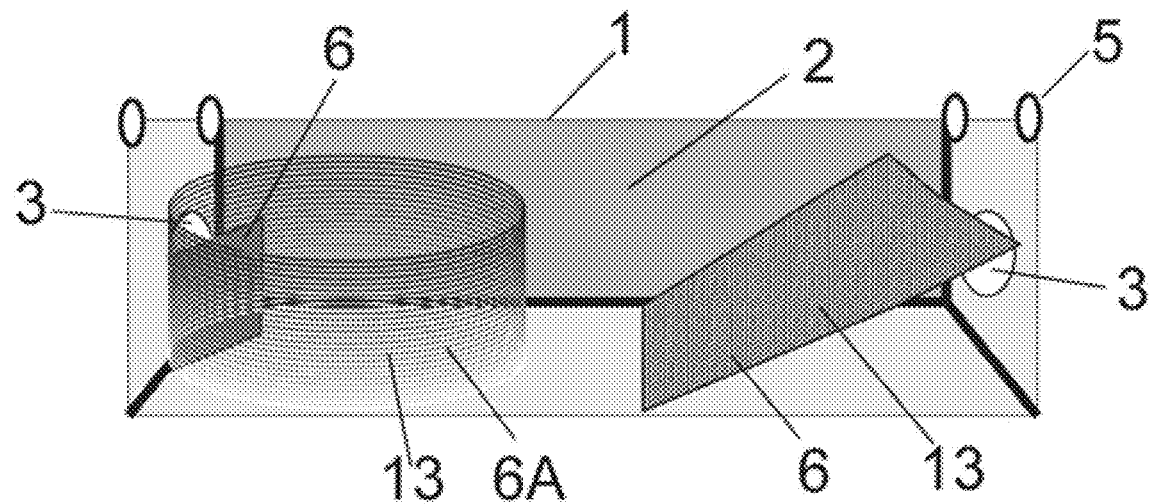
FIG. 5A is a cross-section view of a base member with circular wall member 6A constructed of rigid sided, fluid pervious material 13. Inside the circular wall member 6A is a planar, rigid wall member 6 constructed of fluid impervious material 12 suitable for directing flow around the inside edge of the circular wall member 6A. The incline planar wall member 6 is constructed of fluid pervious material 13 and is positioned higher than the effluent outlet elevation, to retain the total solids in the base member. Fluid flow is from left to right in this configuration.
Figure 5B:
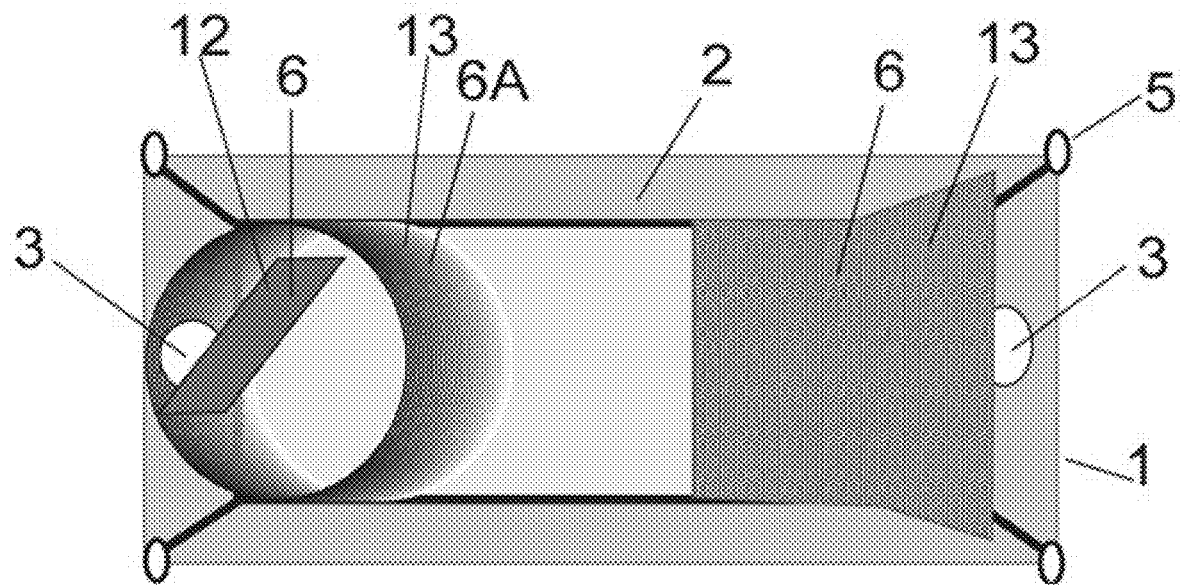
FIG. 5B is a top view schematic of the base member of FIG. 5A, showing the circular base member 6A and planar wall member 6. Both are shown as being fluid pervious 13. A rigid sided, fluid impervious 12 wall member 6 is shown within the circular wall member 6A.
Figure 5C:
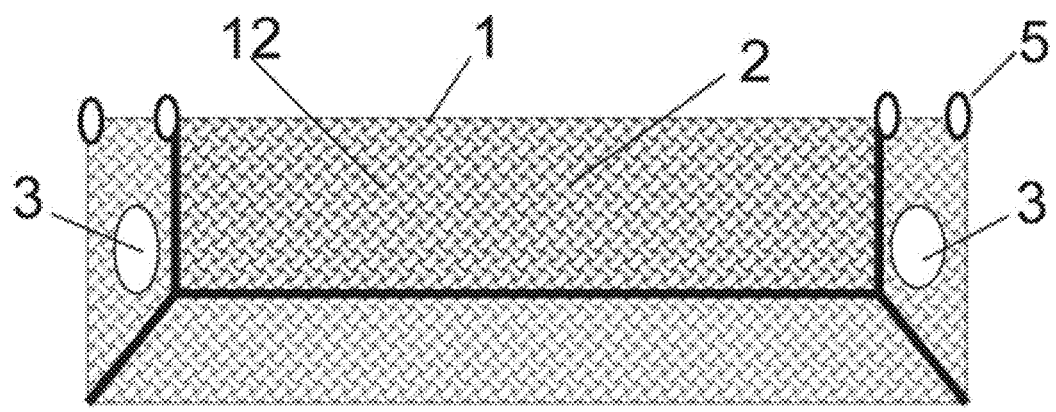
FIG. 5C is a cross-section side view of a base member without wall members 6, used for mixing and inducing fluid flow into the apparatus. It is made of rigid, fluid impervious sides and base materials 12.
Figure 5D:
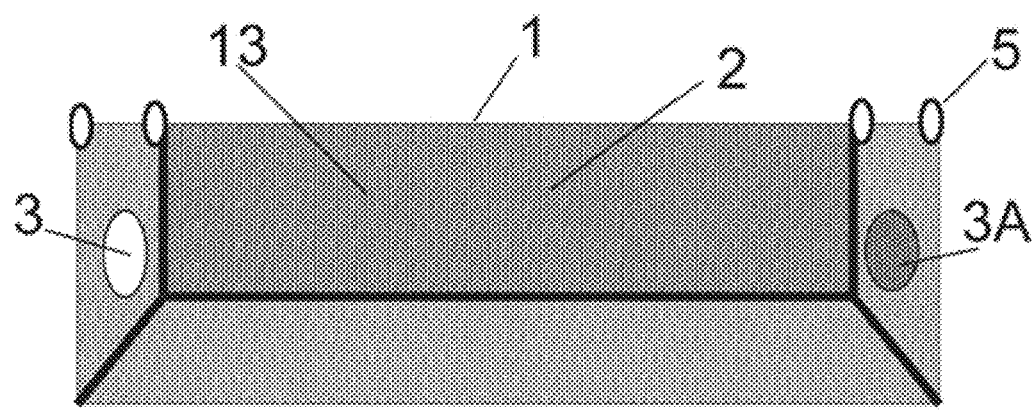
FIG. 5D is a cross-section side view of a base member without wall members 6, used for filtering of solids from fluid entering the apparatus. It is made of flexible, fluid pervious materials 13. It also depicts a closed opening 3A on the effluent side, which may be the last base member of the apparatus. Depending upon use and direction of the base member in the system, the openings 3/3A on the influent and effluent ends can be opened and/or closed. Both openings can be in the closed position when the total solids are held in place until they can be processed and removed, or for a transporting base member, when under transport.
Figure 5E:
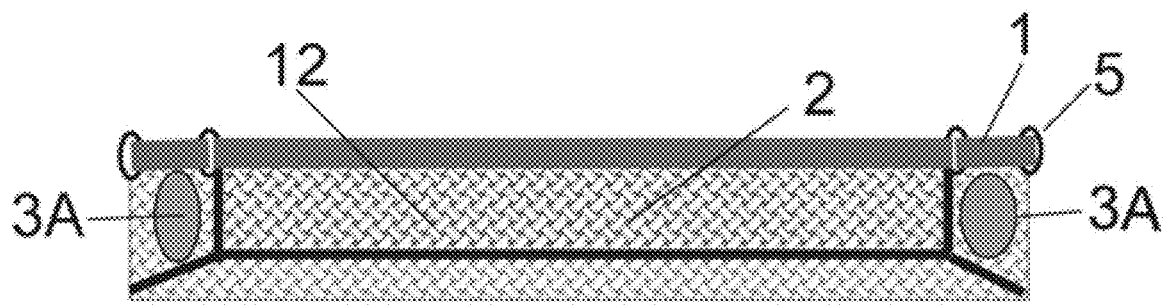
FIG. 5E is a cross-section side view of a base member with fluid impervious materials 12 without wall members 6. When the influent and effluent openings are in closed position, the base member functions as a transport base member for transporting solids or remaining portions of the apparatus itself to and from the point of use to a pump intake or shore-based location for handling and removal of solids off the surface water body. A floatation member 1 on the upper perimeter of the base member, when present, can be used for transporting.
Figure 5F:
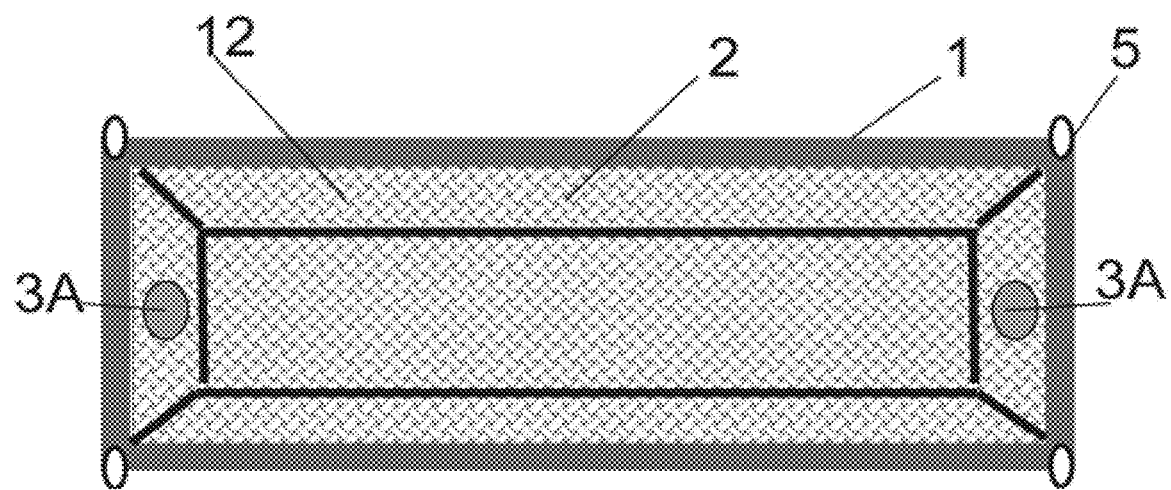
FIG. 5F is a top view schematic of the same base member configuration shown in FIG. 5E. The base member, when serving as a transportation base member, can use larger floatation members 1 than other portions of the apparatus due to its movement across a surface water body surface when there may be waves or turbulence under tow. A cover, not shown, could also be used during transport of this base member configuration.

As shown on FIGS. 5C, 5D, 5E and 5F, base members do not require wall members or baffles. Base members with wall members as shown in FIGS. 5A and 5B, are the primary area for separation and recovery of total solids. Base members without wall members or baffles can be used as transport containers to move recovered total solids from the apparatus to a pump intake or land-based handling and storage area. Base members without wall members can also be used for either: (1) mixing and inducing fluid flow; or (2) as a final step in removing total solids by filtration. In a preferred embodiment, the base member for mixing and inducing of fluid flow would be the first base member in series and would be constructed of rigid, fluid impervious materials 12 to maintain shape of the base member during agitation of fluid initially entering the base members of the apparatus. The base member without wall members that is used as a final filtration step would preferably be the final base member in series and constructed of flexible, fluid pervious materials 13. The perviousness and size of the final base member would be selected to optimize recovery of remaining total solids without overly restricting effluent fluid flow through the pervious sides and base of this base member.

In one embodiment, the final base member of the apparatus can be a transport base member of either a rigid or flexible material, preferably fluid impermeable, used to move recovered total solids to some extraction point (shore, pump intake, etc.).

As shown in FIG. 1, rigid piping or rods 4 can be attached to or placed in the base member or floatation member of the floatable apparatus to maintain shape and operation of the apparatus, particularly with wind and wave disturbance during operation. The piping or rods 4 can extend a portion or the full length of the base or floatation member or as shown in FIG. 7 be driven into the sediment through attachment points 5 on the apparatus. In FIG. 1, two base members are fluidly connected in series where the piping or rods 4 can extend across one or both of the base members for maintaining the shape of the apparatus and connected base members. Perforated rigid piping can be added into the trough structures created by the base members to add or remove fluid or total solids. For the rectangular configuration (FIG. 2B), one or more pipes or rods can be located along the interior edges of the base member.

Attachment points 5, as shown in FIGS. 1 and 7, can be situated anywhere on the floatable apparatus to serve as anchor or attachment points to other parts of the apparatus. The attachment points can also be used to attach accessories to the apparatus, such as but not limited to weights, buoys, rigid rods, suspension cables, ropes, chains, structural supports, anchors, piping, pumps, rafts or boats. Attachment points can be loops, loop/hook (e.g., VELCRO™), grommets, stitching, ties or other means for connecting the accessories to the floatable apparatus.

The wall members 6 and 6A as shown in FIGS. 5A and 5B serve to divide the base member trough into one or more compartments to aid in mixing and separation of total solids from fluid pumped into or entering the apparatus. Wall members can be constructed of continuous film or fabric or solid material, such as the same material used for the base member or wood or rigid plastic and be either pervious or impervious to fluid. Wall members can be configured in any horizontal to vertical plane or three-dimensional shape, such as a circle, to serve as fluid dams, weirs, baffles or barriers in a manner which assists in collection, mixing, separation, containment and removal of total solids from fluid entering or pumped into the apparatus.

A three-dimensional circular wall member with rigid, fluid pervious material 12 sides is shown in FIGS. 5A, 5B, 6 and 7. In operation, the circular wall member helps to separate total solids from fluid using centripetal forces, resistance of solids, and density differences between the solids and fluid. This is accomplished by directing higher velocity influent fluid flow and total solids content tangentially along the upper interior radial side of the circular member. Fluid flow velocity remains greatest along this interior radial side of the circular member which promotes movement and concentration of entrained solids by centripetal forces towards the center and base or top of the interior of the circular wall area due to relative resistance and density of total solids versus the fluid and reduced areas of fluid flow velocities. Solids denser than water would tend to settle to the base of the circular member where they could be pumped out as needed. Total solids less dense than water would tend to rise towards the top where they could be skimmed off. The density of total solids can be modified just prior to the circular member in the at least one base member used for mixing and inducing flow of fluid into the base member with the circular wall member. The sides and base of the circular wall member would preferably be constructed of rigid to semi-rigid, fluid pervious material 12. Rigidity of the wall would assist with maintaining its shape during operation. Fluid perviousness of circular wall material would be selected to optimize fluid flow transmission through the wall member sides while retaining total solids by filtration.

Particle separation media, or chemically-reactive or biologically-reactive or sorptive media or coated media such as polyester matting, sand, iron filings, liquid-phase granular carbon, iron oxide or lanthanum-coated granular carbon or aluminum-coated granular carbon or coated porous media such as plastic beads or filter fabric, or bacteria inoculated granular carbon can be placed between wall members to aid in separation, containment and removal of total solids from fluid in a base member of the floatable apparatus.

One or a plurality of collection members 7 can be attached to the influent opening 3 of a first base member, through a closable opening 3 (OPEN) or 3A (CLOSED) on the collection member. The collection members are configured to collect, contain and isolate areas of surface water for processing of fluid containing total solids through the floatable apparatus. Collection members are constructed of continuous, fluid pervious or impervious, film or fabric (such as but not limited to polyester, polyethylene, nylon and plant fiber based or polyvinyl chloride coated fabrics or rigid sheeting) with upper floatation members 1 or a sleeve for receiving floatation member 1 and lower tubular sleeves 8 or connection points 9, such as grommets or loops to hold weights. They can be of any length and width and extend fully or partially through the water column (the vertical span of water between the water surface and bottom sediment), or fixed to collect fluid and total solids from a targeted water column depth interval.

Example configurations of the collection members are shown in FIGS. 3 and 6A-D. In one configuration, the containment area 14 is open (see FIG. 3A) and in another configuration, the collection members can be drawn together to create a closed containment area 14 (see FIG. 3B). In yet another embodiment, the collection area can be divided using at least one additional collection member to create separate containment zones (see FIGS. 6C and 6D) or to enclose the containment area 14 (see FIGS. 6A and 6B). A plurality of collection members can be connected serially to provide a length sufficient for a desired containment zone. In another configuration, a plurality of collection members can be connected to other collection members as shown in FIG. 6C to create a desired number of containment zones 14. In operation, the collection members can be drawn together to encircle the total solids and pulled or drawn back to induce fluid flow into the first base member for processing (see FIGS. 6B and 6E).

Dividing a containment area by use of additional collection members assists with several functions of the apparatus. One function would be changing the position of the apparatus to capture a natural or induced fluid flow containing targeted total solids. In this manner, the end of the center collection member can be fixed and the base members and shorter collection members rotated to intercept the targeted total solids. Another function, as shown in FIG. 6B, would allow the use of this additional collection member to extend outward and around an area of total solids in fluid then to induce the contained area of total solids in fluid to flow into the opening of the base members by drawing or pulling back the additional collection member. A similar function occurs when the apparatus is relatively fixed in position to a particular location such as to opposing shorelines in a windward bay, along an area of docks, extending off a shoreline feature, or around a known pollutant source such as a contaminated ground water infiltration area or discharge pipe. In these relatively fixed configurations, additional collection members can be used to improve the effectiveness of the apparatus by increasing the containment area 14 and by inducing a larger or more distant area of targeted total solids in fluid to flow towards and into the base members of the apparatus. FIG. 6E depicts various possible configurations of the apparatus and use of more than one collection member in an example surface water body area. Additional collection members can also be linked to each other to extend the aerial coverage or reach of the collection members in the surface water body.

The lower tubular sleeves of the collection members can house weights, such as chains or weighted rope. The collection members can either be left open to collect, contain and direct fluid flow and total solids into the apparatus, or the outer ends can be drawn together using rope, grommets and attachment points to contain a targeted volume of fluid and total solids, or extend to the shore of a surface water body to allow for containment and processing through the apparatus of targeted areas of fluid and total solids in a surface water body. FIG. 3 depicts open and closed configurations of the collection members. FIG. 6A shows an additional collection member being used to induce flow of fluid containing targeted total solids back into the apparatus's containment area 14. FIG. 6B shows the same additional collection member from FIG. 6A being attached to the apparatus and drawn back against the opening 3 of the apparatus' base member area as a means to induce the contained area of fluid and total solids to flow into the base members for separation, containment and removal of total solids from fluid.

When not needed, collection members can be deflated and drawn back to the base member or detached from the floatable apparatus and either removed from the surface water body or left in place for future use by the floatable apparatus. Although FIG. 1 depicts a specific configuration, additional collection members of different lengths, widths or locations within a surface water body as shown in FIGS. 6A, 6B, 6C, 6D, 6E and 8B can be used by the apparatus when needed. As shown in FIGS. 6A, 6B and 6E, water can be induced to flow into the base members by drawing in one or more collection members, by pumping, or by allowing fluid with total solids to flow into the base member by the natural action of wind, waves or currents. Rigid piping or rods 4 can be added to the collection member to aid in controlling the shape and function of the apparatus or to add fluid in the collection member area to enhance separation of total solids from fluids. FIGS. 7A and 7C show example embodiments of a plurality of rods 4 to maintain its location and function within a surface water body.

Collection members are configured to collect, contain and isolate areas of fluid containing total solids in a surface water body for concurrent or later processing of fluid containing total solids through the floatable apparatus. In this manner, multiple collection members, as in FIGS. 6A and 6E, can be used in different locations within the same surface water body. The floating base member portions of the apparatus can then be moved from one area of collection member use to another to remove collection member contained and isolated areas of total solids in fluid as shown in FIGS. 6A, 6B and 6E. As also shown in FIGS. 6B and 6E, total solids in fluid isolated by the collection members is induced to flow into the base members by drawing or pulling collection members back through or along the base member influent side opening 3. In this manner, use of pumping systems can be avoided or minimized and flow rates into the base members controlled to maximize removal of total solids from fluid all while keeping the contained area of total solids and fluid and any apparatus operational substances such as flocculants or pesticides isolated from the rest of the surface water body. Collection members can be designed to extend from the water surface to any desired depth of the water body in a manner to maximize collection, containment and isolation of total solids in fluid within a particular surface water body area. Often, the depth of the collection members can be limited by the depth to the sediment surface or top of the hypolimnion when present. As shown on FIG. 6E, collection members of the apparatus can also be used to contain targeted areas of a surface water body such as an area of invasive species prior to use of pesticides or an area of planned sediment disturbance as a means to isolate these areas from other portions of the surface water body. FIG. 6E shows additional uses and configurations of the apparatus and collection members that take into account specific surface water body features such as shores, bays, bars and points, influent and effluent water flow areas, areas of boating traffic, predominant wind direction, ground water infiltration or outflow areas, areas of aquatic vegetation, docks or areas where total solids in fluid may tend to naturally accumulate and where setup and operation of the apparatus is easier for collection and removal of total solids from fluid. FIG. 6E also indicates that there are different regions of most water bodies where total solids in fluid tend to accumulate or move in a concentrated mass. These areas may include: 1) Influent and effluent streams where fluid flow is focused and confined by stream banks; 2) Along points or bars extending into a water body where natural fluid flow may tend to push and concentrate total solids against a shoreline area; 3) Where source(s) of nutrients or contaminants such as impacted ground water infiltration or pipe discharges may tend to generate total solids upon discharging into the water body; 4) Some accumulation or concentration areas are not visible at the water surface such as presented by rooted aquatic plants or changes in water body bathymetry which similar to stream banks, may tend to focus and concentrate total solids in fluid; 5) Some areas are just natural embayments or areas of shoreline in the predominant windward sides of a water body where total solids in fluid can be concentrated; 6) Areas such as docks or similar manmade features may also tend to concentrate total solids from fluid due to their resistance and alteration of fluid flow; and, 7) areas of invasive species (plant or animal) or sediment removal prior to release or suspension of total solids into fluid associated with planned treatment or sediment disturbance. As total solids in fluid are collected, the collection members can be drawn together to contain and isolate these solids until processed through the base members.

FIGS. 5A-5F and 6B shows three forms of base members: 1) a rigid, fluid impervious 12 sided and floored base member that can be used for mixing fluid or transporting solids and the apparatus; 2) a base member with three different wall member 6/6A configurations that is the primary base member for separation and containment of total solids; and 3) a base member with flexible, fluid pervious 13 sides and floor to help filter out total solids from fluid. The collection members and apparatus can also be fixed in place using rods 4 as shown in FIGS. 7A, 7B and 7C. Fixing the apparatus in place can help secure the apparatus from wildlife, boat traffic, unrestricted access, or strong winds, waves or currents.

Figure 4:
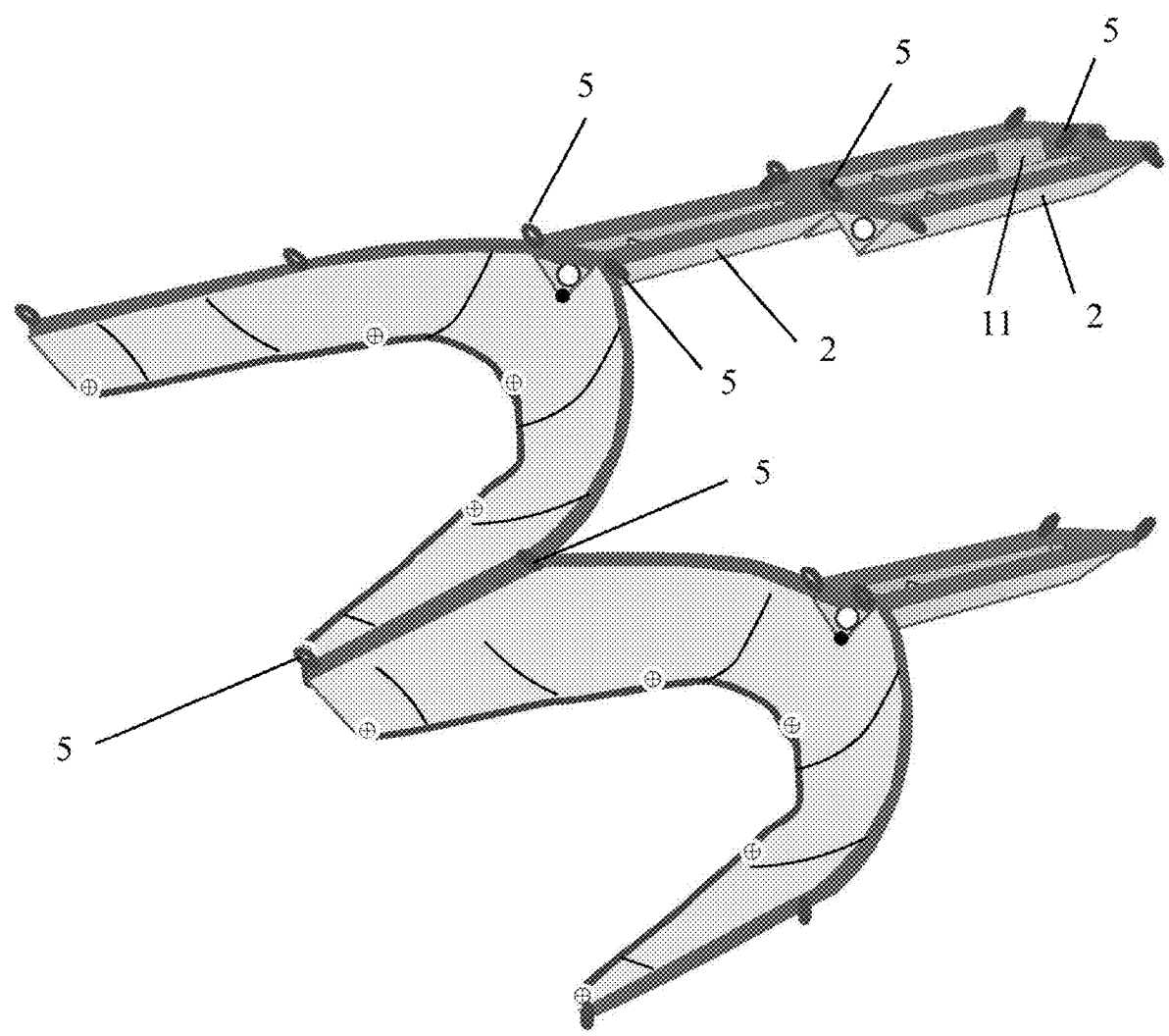
FIG. 4 is a schematic of two example flotation apparatuses connected together by way of attachment points 5. Also shown are two base members 2 connected in parallel by attachment points 5.

As shown on FIG. 6E, the apparatus can be floated, moved and deployed in selected areas of a surface water body, such as at swimming beaches, at outlets, or areas where total solids in fluid including harmful algae blooms have concentrated or are likely to be captured by the apparatus. The apparatus can also be anchored, secured with rods 4 and attached to a fixed structure as shown in FIGS. 6E and 7A-C to maintain its location and function within a surface water body. As shown in FIGS. 4, 6B and 7, a plurality of apparatus base member troughs can be linked together side by side or end to end to increase fluid and total solids containment volume, fluid flow retention time, and the available time for separation and containment of total solids from fluid. Linked floatable apparatuses can also be positioned such that collection members can capture and direct flow into the apparatus from different directions and areas, or to increase the overall collection volumes of fluid and total solids for processing through one or more apparatuses in a surface water body, as shown in FIGS. 4, 6C and 6D. A side opening 11 between base members is shown on FIG. 4.

The primary function of the floatable apparatus described herein is to provide an easily portable, floatable and scalable means to collect, mix, separate, contain and remove total solids, including sediments, algae and cyanobacteria, from fluid in a surface water body.

A secondary function of the floatable apparatus is to allow for the targeted alteration of physical, biological or chemical properties of fluid and total solids within the collection member or base member areas of the apparatus to assist with the separation, containment and removal of total solids from fluid in a surface water body by mixing, sorption, settling, floatation or filtering. Commercially-available or proprietary flocculants, coagulants, biological or chemical substances and mixtures and coatings, physical alterations, dissolved or dispersed gas injection, or pumping or injection of liquid, gases, and liquid-gas mixtures can be used to increase the effectiveness of total solids collection, mixing, separation, containment and removal by the floatable apparatus.

A third function of the floatable apparatus is to separate and contain settled or floated total solids in a manner which minimizes redistribution of these total solids with fluid flow continuing through the floatable apparatus until the total solids can be removed.

A fourth function of the floatable apparatus is to be readily portable, floatable and deployable so that targeted areas of total solids in a surface water body, such as a harmful algae bloom area or prior to a surface water outlet, can be captured using the collection members and then processed through the base members for separation, containment and removal of total solids.

A fifth function of the floatable apparatus is to allow for either passive or active collection, mixing, separation and containment of total solids from fluid using natural or induced water flows or pumping before removal of recovered total solids from a surface water body.

A sixth function of the floatable apparatus is to provide floatable and portable containment capacity for removal of total solids collected and separated out in the apparatus. In this manner, as the operation of the floatable apparatus collects, separates and contains total solids from fluid of a surface water body, total solids filled base member troughs can be detached or total solids pumped out or placed into separate base member troughs for transporting and further processing, such as dewatering of total solids and/or transport to access points along the water body shore for land-based reuse or disposal of these contained total solids.

A seventh function of the apparatus is to allow for recycling and reuse of commercially-available and proprietary flocculants, coagulants, biological or chemical substances and mixtures and coatings to minimize costs and further enhance the removal of total solids from fluid entering the apparatus. For example, at least a portion of the effluent can be pumped back to the inlet of the floatable apparatus to thereby recycle the chemicals or additives back into the system, after the total solids have been removed.

In accordance with the foregoing functions, in one aspect the floatable apparatus can be used in a method for removing total solids from fluid of a surface water body, comprising: deploying a floatable apparatus on the surface of a water body to remove total solids from fluid of a surface water body; allowing (e.g., by natural fluid flow, such as driven by wind or a current in a river) or inducing fluid flow (e.g., created by drawing back one or more collection members, pumping, dragging or creating a current) or by pumping fluid and total solids from the surface water to enter the floatable apparatus; collecting the total solids in the interior of the base member of the floatable apparatus; and optionally disposing the total solids. Fluid flow can be induced, for example, by dragging the apparatus or collection members through a water body such as with a boat. Any of the various embodiments and features of the floatable apparatus described herein can be used to carry out the method.

In another aspect, the floatable apparatus can be used in a method for controlling total solids, algae or cyanobacteria in a surface water body, comprising: deploying the floatable apparatus to a specific area of the water body identified as containing targeted volumes of total solids, algae or cyanobacteria, using the collection members to capture and collect the targeted volume for mixing and treatment with chemical or physical processes in the collection and base members of the apparatus to separate, contain and remove the total solids, algae or cyanobacteria from the surface water body. Any of the various embodiments and features of the floatable apparatus described herein can be used to carry out the method.

In yet another aspect, the collection members of the apparatus can be used to enclose a target area comprising invasive or nuisance plants, animals or sediment and total solids to be treated or removed from the target area. After treatment of invasive or nuisance plants or animals, or for sediment removal only, the sediment and total solids within the isolated collection area can be disturbed to cause the organic detritus, plant material, sediment and total solids to become suspended or float in the target area for further processing through the base members to remove the total solids from the fluid. Any method for disturbing the organic detritus, plant material, or sediment such that it can be collected in the floatable apparatus is contemplated herein. In one aspect, the organic detritus, plant material and sediment can be physically disrupted using agitation, such as raking the sediment. In another aspect, these solids can be disturbed by injecting liquid or liquid/gas mixtures into the sediment to cause the solids to rise or float or otherwise be suspended and directed into the collection and base members of the floatable apparatus.

While this disclosure has been particularly shown and described with references to example embodiments thereof, it will be understood by those skilled in the art that various changes in form and details may be made therein without departing from the scope encompassed by the appended claims.

What is claimed is:

1. A floatable apparatus for removal of solids from a targeted water column or a targeted water column depth interval in a water body, comprising:
    at least one base member enclosure, wherein the at least one base member comprises rigid to flexible, fluid pervious to impervious material and having an exterior, closed bottom, and an open or closed top having a perimeter, an inlet for influent on one end of the base member, an outlet for effluent on or near the opposite end of the base member, and an interior, wherein the interior of the at least one base member comprises at least one wall member to separate and contain solids selected from dissolved solids, colloidal solids, suspended solids, nutrients, algae or cyanobacteria;
    fluidly connected to the at least one base member enclosure is at least one other base member enclosure of rigid to flexible, fluid pervious to impervious materials and having an exterior, an interior, closed bottom, and an open or closed top having a perimeter, wherein the base member has an inlet for influent on one end of the base member, an outlet for effluent on or near the opposite end of the base member, and wherein the interior provides a compartment that does not possess wall members or baffles for at least one of mixing, filtering or transporting the solids;
    fluidly connected to the at least one base member is at least one collection member of rigid to flexible, fluid pervious to impervious material configured to direct fluid containing solids through an opening into the inlet of at least one of the base members, the at least one collection member further comprising an upper perimeter having a tubular sleeve for receiving a floatation member, a bottom perimeter and a tubular sleeve at the bottom perimeter for receiving a weight, wherein the at least one collection member extends through a targeted water column or a targeted water column depth interval;
    floatation member of rigid to flexible, fluid pervious to impervious material connected or inserted into the perimeter of at least one of the base members and the upper perimeter of the collection member, the floatation member being removeable, inflatable or deflatable to deploy at least one of the base and collection members to a targeted water column or a targeted water column depth interval; and
    at least one attachment point on at least one of the base members, collection member and floatation member.

2. The floatable apparatus of claim 1, wherein the at least one attachment point is configured for attaching at least one of the base members to the at least one collection member, attaching at least one of the base members to the floatation member, or attaching at least one accessory to the floatable apparatus.

3. The floatable apparatus of claim 2, wherein the at least one accessory is selected from weights, rigid rods, buoys, suspension cables, ropes, structural supports, anchors, chains, rafts, boats, pumps or piping.

4. The floatable apparatus of claim 1, further comprising at least one other collection member attached to the first collection member at any point along its length or at its end.

5. The floatable apparatus of claim 1, wherein the at least one collection member, when attached to at least one base member, is configured as a narrowing yoke or fork structure having two fork members and distal and proximal ends, a slot or opening extending between the two fork members starting from the distal end and narrowing moving towards the proximal end, terminating at a narrowed curved or arcuate concave surface at the location where the two fork members join together.

6. The floatable apparatus of claim 1, wherein at least one of the base members has a cross-section width that is V-shaped with the small end of the V-shape located at the bottom of the at least one base member.

7. The floatable apparatus of claim 1, wherein at least one of the base members has a cross-section width that is square or rectangular in shape.

8. The floatable apparatus of claim 1, wherein at least one of the base members houses one or more pipes spanning the length of the base member, or attached to the at least one attachment point thereon.

9. The floatable apparatus of claim 1, wherein the floatable apparatus or portion thereof can be covered with a removable material to provide a barrier from the environment or to enhance the removal of the solids from fluid and to aid in recovery and recycling of treatment substances or fluids.

10. The floatable apparatus of claim 1, wherein the at least one wall member is planar, circular or three dimensional in shape and comprises rigid to flexible, fluid pervious to impervious materials.

11. The floatable apparatus of claim 1, wherein a) the at least one base member is fluidly connected in series to at least one other base member; b) the at least one base member is fluidly connected in parallel to at least one other base member; or c) the at least one base member is fluidly connected in series and parallel, to at least two other base members.

12. A method for removing solids from a targeted water column or a targeted water column depth interval in a water body, comprising:
deploying a floatable apparatus of claim 1 to a targeted water column or a targeted water column depth interval in a water body; wherein the solids are selected from dissolved solids, colloidal solids, suspended solids, nutrients, algae or cyanobacteria;
allowing or inducing fluid flow or by pumping fluid and the solids from the water column or water column depth interval to enter the floatable apparatus;
collecting the solids in the interior of the at least one base member of the floatable apparatus; and
optionally disposing the solids.

13. The method of claim 12, further comprising removing at least a portion of the effluent and then recirculating the effluent back to the inlet of the floatation apparatus.

14. A method for removing solids from a targeted water column or a targeted water column depth interval in a water body, comprising:
deploying the floatable apparatus of claim 1 to a targeted water column or a targeted water column depth interval of the water body identified as containing targeted volumes of solids selected from dissolved solids, colloidal solids, suspended solids, nutrients, algae or cyanobacteria;
capturing the solids with the at least one collection member and directing the targeted volumes of solids and fluid into the at least one base member; and
mixing and treating the solids with chemical or physical processes in the at least one base member of the apparatus to remove the solids, from the water.

15. A method for removing invasive or nuisance plants or animals or sediment from the bottom of a water body, comprising:
deploying the floatable apparatus of claim 1 onto the specific area of the water body identified as containing invasive or nuisance plants or animals, or sediment;
treating then disturbing and suspending organic detritus, plant matter, and sediment within a containment area formed by the at least one collection member; and
processing the suspended organic detritus, plant matter or sediments through the at least one base member of the floatable apparatus to remove the solids and sediment from the fluid.

16. A floatable apparatus for removal of solids from a targeted water column or a targeted water column depth interval in a water body, comprising:
at least one base member enclosure, wherein the at least one base member comprises rigid to flexible, fluid pervious to impervious material and having an exterior, closed bottom, and an open or closed top having a perimeter, an inlet for influent on one end of the base member, an outlet for effluent on or near the opposite end of the base member, and an interior, wherein the interior of the at least one base member comprises at least one wall member to separate and contain solids selected from dissolved solids, colloidal solids, suspended solids, nutrients, algae or cyanobacteria;
fluidly connected to the at least one base member enclosure is at least one other base member enclosure of rigid to flexible, fluid pervious to impervious materials and having an exterior, an interior, closed bottom, and an open or closed top having a perimeter, wherein the base member has an inlet for influent on one end of the base member, an outlet for effluent on or near the opposite end of the base member, and wherein the interior provides a compartment that does not possess wall members or baffles for at least one of mixing, filtering or transporting the solids;
floatation member of rigid to flexible, fluid pervious to impervious materials connected to or inserted into the perimeter of the at least one base member, the floatation member being removable, inflatable or deflatable to deploy the at least one base member of the floatation apparatus to a targeted water column or a targeted water column depth interval; and
at least one attachment point on at least one of the base member and floatation member.

17. The floatable apparatus of claim 16, wherein the outlet for effluent is connected to a natural fluid outlet or manmade fluid outlet of a water body.

18. A method for removing solids from a targeted water column or a targeted water column depth interval in a water body, comprising:
deploying a floatable apparatus of claim 16 to a targeted water column or a targeted water column depth interval in a water body; wherein the solids are selected from dissolved solids, colloidal solids, suspended solids, nutrients, algae or cyanobacteria;
allowing or inducing fluid flow or by pumping fluid and the solids from the water column or water column depth interval to enter the floatable apparatus;
collecting the solids in the interior of the at least one base member of the floatable apparatus; and
optionally disposing the solids.

19. A method for removing solids from a targeted water column or a targeted water column depth interval in a water body, comprising:
deploying the floatable apparatus of claim 16 to a targeted water column or a targeted water column depth interval of the water body identified as containing targeted volumes of solids selected from dissolved solids, colloidal solids, suspended solids, nutrients, algae or cyanobacteria;
directing the targeted volumes of solids and fluid into the at least one base member; and mixing and treating the solids with chemical or physical processes in the at least one base member of the apparatus to remove the solids from the water.

20. A method for removing sediment from the bottom of a water body, comprising:
    deploying the floatable apparatus of claim 16 onto the specific area of the water body identified as containing sediment;
    disturbing and suspending sediment within the collection member; and
    processing the suspended sediments through the at least one base member of the apparatus to remove the sediment from the fluid.

21. A method for treating invasive or nuisance plants or animals in a water body, comprising:
    deploying the floatable apparatus of claim 16 onto the specific area of the water body identified as containing invasive or nuisance plants or animals;
    enclosing the targeted area of invasive or nuisance plants or animals with the at least one collection member; and,
    treating the enclosed area with physical methods or chemical substances to control the targeted invasive or nuisance plants or animals;
    disturbing and suspending sediments, plant or animal matter within the collection member; and,
    processing the suspended sediments, plant and animal matter through the at least one base member of the apparatus to remove the sediments, plant and animal matter from the fluid.

22. A floatable apparatus for containment of solids in a targeted water column or a targeted water column depth interval in a water body, comprising:
    at least one collection member of rigid to flexible, fluid pervious to impervious material extending through a targeted water column or a targeted water column depth interval, comprising an opening configured to direct fluid containing solids into an inlet of a floatable collection apparatus when present, the at least one collection member further comprising an upper perimeter having a tubular sleeve for receiving a floatation member, a bottom perimeter and a tubular sleeve at the bottom perimeter for receiving a weight;
    floatation member of rigid to flexible, fluid pervious to impervious material connected or inserted into the perimeter of at least one of the base members and the upper perimeter of the collection member, the floatation member being removeable, inflatable or deflatable to deploy the at least one collection member to a targeted water column or a targeted water column depth interval; and
    at least one attachment point on at least one collection member.

23. A method for containment of solids in a targeted water column or a targeted water column depth interval in a water body, comprising:
    deploying the floatable apparatus of claim 22 to a targeted water column or a targeted water column depth interval of the water body identified as containing targeted volumes of solids selected from dissolved solids, colloidal solids, suspended solids, nutrients, algae or cyanobacteria; and
    directing the targeted volumes of solids and fluid into the at least one collection member to create a containment area.

24. The method of claim 23, further comprising removing the solids from the containment area by fluidly connecting the opening on the at least one collection member to an inlet on a floatable collection apparatus;
    directing the targeted volumes of solids and fluid into at least one base member of the floatable collection apparatus; and
    mixing and treating the solids with chemical or physical processes in the at least one base member to remove the solids from the water;
    wherein the floatable collection apparatus comprises:
    at least one base member enclosure, wherein the at least one base member comprises rigid to flexible, fluid pervious to impervious material and having an exterior, closed bottom, and an open or closed top having a perimeter, an inlet for influent on one end of the base member, an outlet for effluent on or near the opposite end of the base member, and an interior, wherein the interior of the at least one base member comprises at least one wall member to separate and contain solids selected from dissolved solids, colloidal solids, suspended solids, nutrients, algae or cyanobacteria;
    fluidly connected to the at least one base member enclosure is at least one other base member enclosure of rigid to flexible, fluid pervious to impervious materials and having an exterior, an interior, closed bottom, and an open or closed top having a perimeter, wherein the base member has an inlet for influent on one end of the base member, an outlet for effluent on or near the opposite end of the base member, and wherein the interior provides a compartment that does not possess wall members or baffles for at least one of mixing, filtering or transporting the solids;
    floatation member of rigid to flexible, fluid pervious to impervious materials connected to or inserted into the perimeter of the at least one base member and the at least one collection member, the floatation member being removable, inflatable or deflatable to deploy the at least one base member of the floatation apparatus to a targeted water column or a targeted water column depth interval; and
    at least one attachment point on at least one of the base member and floatation member.

* * * * *